DIGITAL INDICATOR CIRCUITRY

Filed Jan. 16, 1957 12 Sheets-Sheet 1

INVENTOR:
Ladimer J. Andrews

By Louis A Kline
John J. Matlago
His Attorneys

INVENTOR:
Ladimer J. Andrews

By Louis A. Kline
John J. Matlago
His Attorneys

INVENTOR:
Ladimer J. Andrews

By Louis A Kline
John J. Matlago
His Attorneys

Legend:
$R_S$ = Interrogate storage cores
$W_C$ = Set control cores
$R_C$ = Interrogate control cores
$W_S$ = Set storage cores INVENTOR:
Ladimer J. Andrews By Louis A Kline
John J. Matlago
His Attorneys Jan. 16, 1962 L. J. ANDREWS 3,017,102

DIGITAL INDICATOR CIRCUITRY

Filed Jan. 16, 1957 12 Sheets-Sheet 5

INVENTOR:
Ladimer J. Andrews

By Louis A Kline
John J. Matlago
His Attorneys

INVENTOR:
Ladimer J. Andrews
By Louis A Kline
John J. Matlago
His Attorneys

INVENTOR:
Ladimer J. Andrews
By Louis A. Kline
John J. Matlago
His Attorneys

INVENTOR:
Ladimer J. Andrews
By Louis A. Kline
John J. Matlago
His Attorneys $a_s = \#2(E_s'F_s + E_s'A_s + F_sA_s) + \#3F_s'A_s + \#4(A_s + E_sF_s' + E_s'F_s) + \#5(F_sA_s)$

| | |
|---|---|
| Compare (E)&(F) | $a_s = \#2(E_s'F_s + E_sA_s + F_sA_s)$ |
| Test for (E)=(F) | $a_s = \#4(A_s + E_sF_s' + E_s'F_s)$ |
| Decrease (F) by one unit | $a_s = \#3F_s'A_s$ |
| Increase (F) by one unit | $a_s = \#5F_sA_s$ |

INVENTOR:
Ladimer J. Andrews

By Louis A Kline
John J. Matlago
His Attorneys $$j_s = J_s P_{1-7} + [\#2(E'_s E_s + E'_s A_s + E_s A_s) + \#4(A_s + E_s F'_s + E'_s F_s) + (\#3 + \#5)] P_8$$

| | |
|---|---|
| Recirculate | $j_s = J_s P_{1-7}$ |
| Count to PC#3 if satisfied otherwise skip to PC#4 | $j_s = \#2(E'_s E_s + E'_s A_s + E_s A_s) P_8$ |
| Count to PC#5 if satisfied otherwise skip to PC#1 | $j_s = \#4(A_s + E_s F'_s + E'_s F_s) P_8$ |
| Skip to PC#1 | $j_s = (\#3 + \#5) P_8$ |

INVENTOR:
Ladimer J. Andrews

By Louis A Kline
John J. Matlago
His Attorneys $k_s = K_s P_{1-7} + [\#1 + \#2(E_s' F_s + E_s' A_s + E_s A_s)] P_8$

| | |
|---|---|
| Recirculate | $k_s = K_s P_{1-7}$ |
| Count to PC#2 | $k_s = \#1 P_8$ |
| Count to PC#3 if satisfied otherwise skip to PC#4. | $k_s = \#2(E_s' F_s + E_s' A_s + E_s A_s) P_8$ |

INVENTOR:
Ladimer J. Andrews

By Louis A. Kline
John J. Matlago
His Attorneys $$\ell_s = L_s P_{1-7} + [\#2(F_s'A_s' + E_s F_s' + E_s A_s') + \#4(A_s + E_s F_s' + E_s' F_s)] P_8$$

| | |
|---|---|
| Recirculate | $\ell_s = L_s P_{1-7}$ |
| Skip to PC#4 if satisfied, otherwise count to PC#3 | $\ell_s = \#2(F_s'A_s' + E_s F_s' + E_s A_s') P_8$ |
| Count to PC#5 if satisfied, otherwise skip to PC#1 | $\ell_s = \#4(A_s + E_s F_s' + E_s' F_s) P_8$ |

INVENTOR:
Ladimer J. Andrews

By Louis A. Kline
John J. Matlago
His Attorneys 3,017,102
DIGITAL INDICATOR CIRCUITRY
Ladimer J. Andrews, Gardena, Calif., assignor to The National Cash Register Company, Dayton, Ohio, a corporation of Maryland
Filed Jan. 16, 1957, Ser. No. 634,524
12 Claims. (Cl. 235—176)

This invention relates to circuitry for incrementally controlling the setting of an indicating device and, more particularly, to circuitry which provides voltage output pulses for incrementally repositioning a shaft to a rotational setting as defined by coded signals supplied by a digital computer, for example.

Control circuits for positioning devices employed to set a pointer, a shaft, the recording pen of a graph plotter, etc., corresponding to a binary coded signal, find extensive utility in the fields of navigation, instrumentation, and others. Thus, in the field of navigation, in order to plot the relationship of a controlled vehicle to a reference vehicle, indicator means are used to show position, course, and speed. Each of these components may be represented by the angular displacement of a rotatable synchro-transmitter shaft to which an indicator pointer is coupled. The rotation of the shaft, in turn, could be employed to represent information utilized as a control for means operable to adjust, for instance, the steering mechanism of the vehicle.

It is therefore an object of the present invention to provide relatively simple controlling means for supplying signals capable of altering the position of an electrically activated device in accordance with coded signals.

It is another object of this invention to provide logical circuitry having a high-speed programmed digital sequence for generating pulses defining the incremental actuation of a device from its present position toward a desired position.

It is another object of this invention to provide accomplishment of the aforementioned objects by a digital process utilizing the inhibit-wound magnetic core approach to logical circuitry mechanization as taught by a copending patent application "Magnetic Core Logical Circuitry," Andrews et al., Serial No. 615,279, filed October 11, 1956.

A more complete understanding of this invention, as well as additional objects and features thereof, may be obtained by reference to the ensuing description of the drawings in which.

Figure 3:
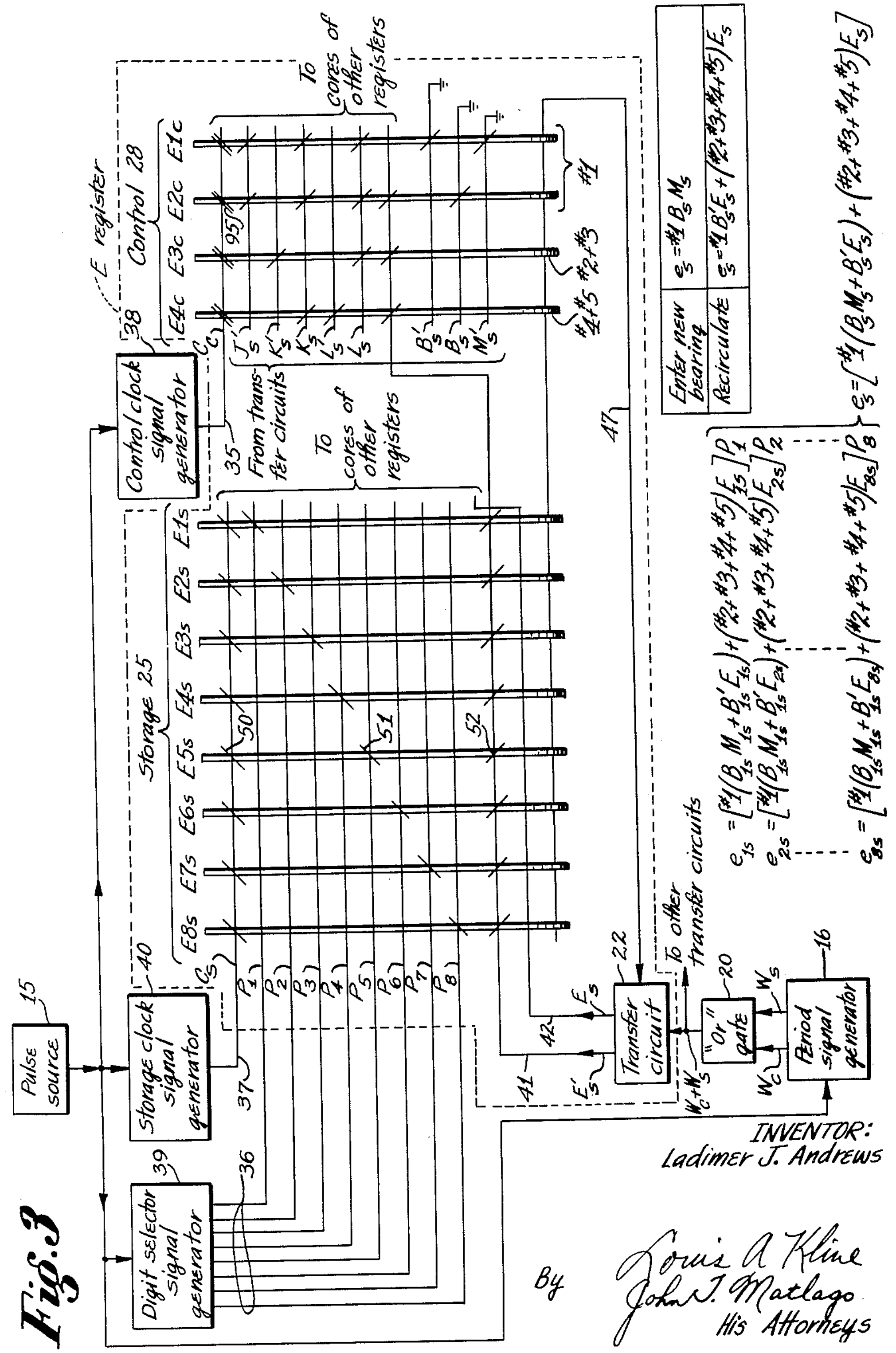
FIG. 3 is a schematic diagram of a typical register as utilized in the invention, being particularly the E register of the data processing unit.
Figure 3A:
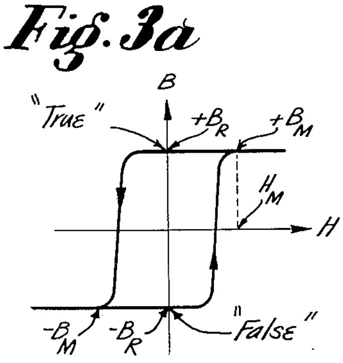

FIG. 3*a* is the preferred hysteresis characteristic of the material of the magnetic cores utilized in the registers.

Figures 3B, 4A:
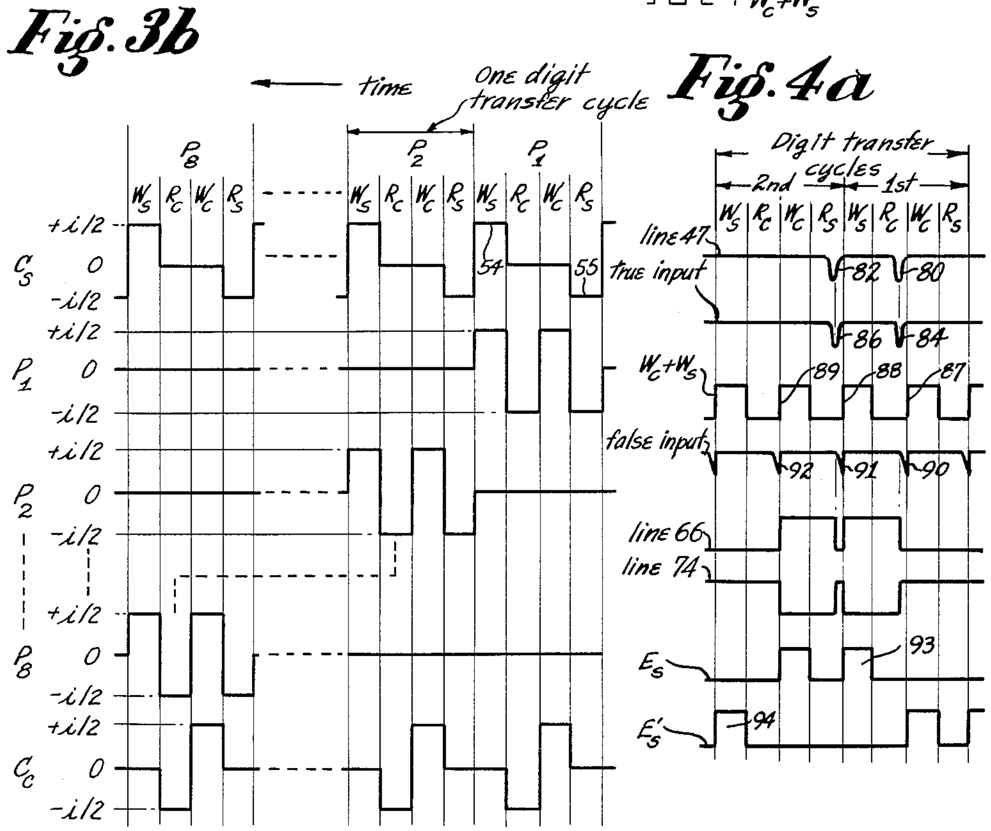

FIG. 3*b* is a group of timing current waveforms used for serially setting and interrogating the magnetic cores of the registers.

Figure 4:
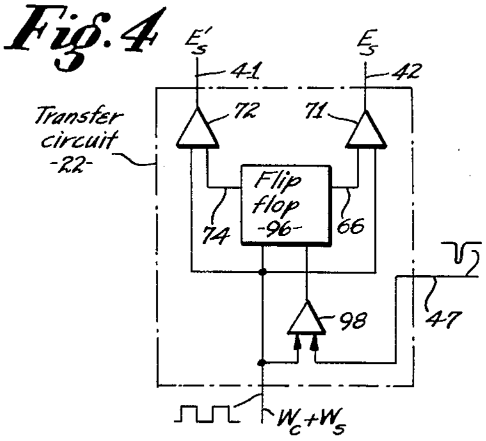

FIG. 4 is a block diagram of the E register transfer circuit.

FIG. 4*a* is a set of curves describing the operation of the E register transfer circuit.

Figures 5, 12:
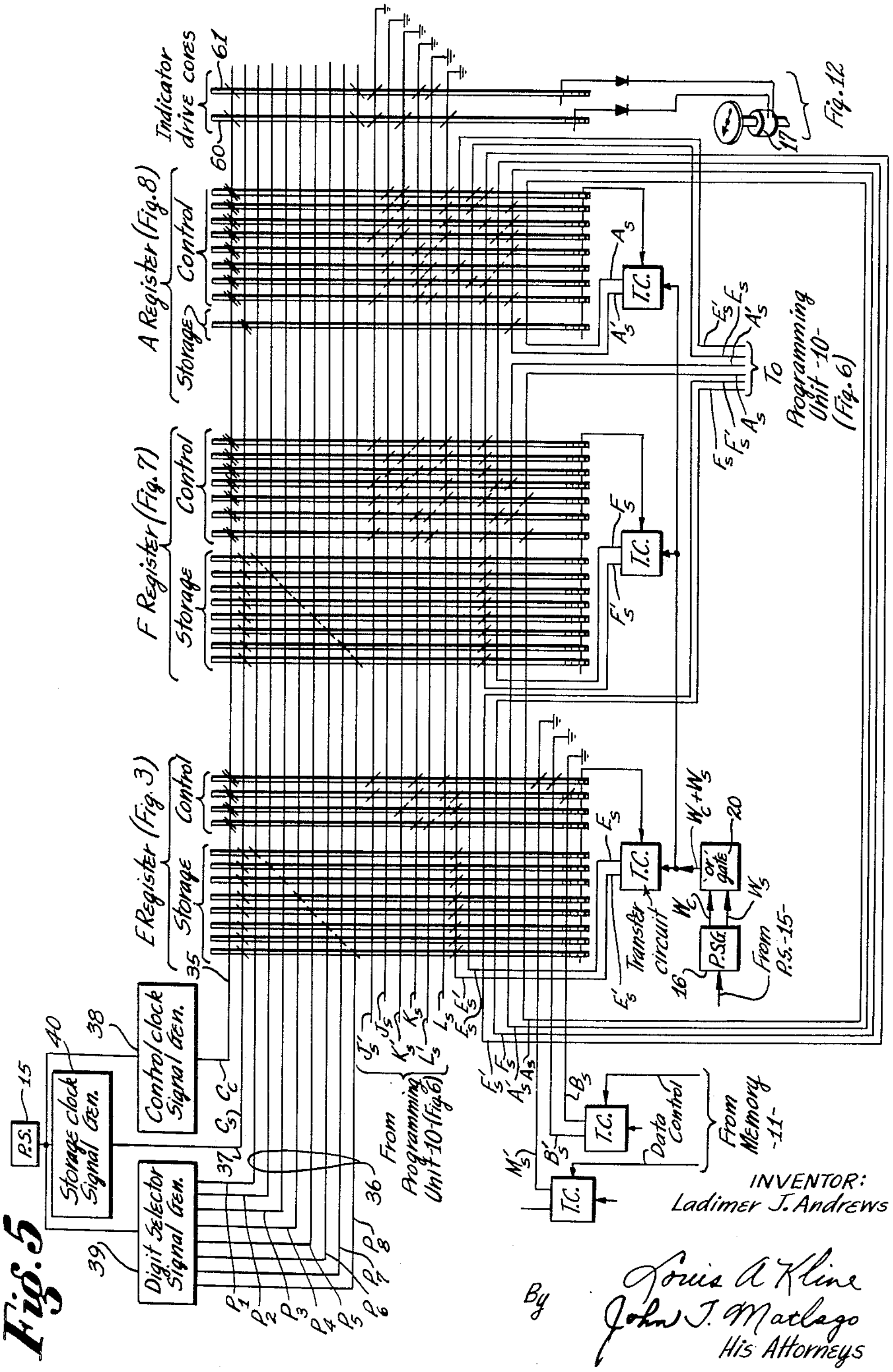

FIG. 5 is a schematic diagram of the data processing unit, showing also input means and the output circuit.

Figure 6:
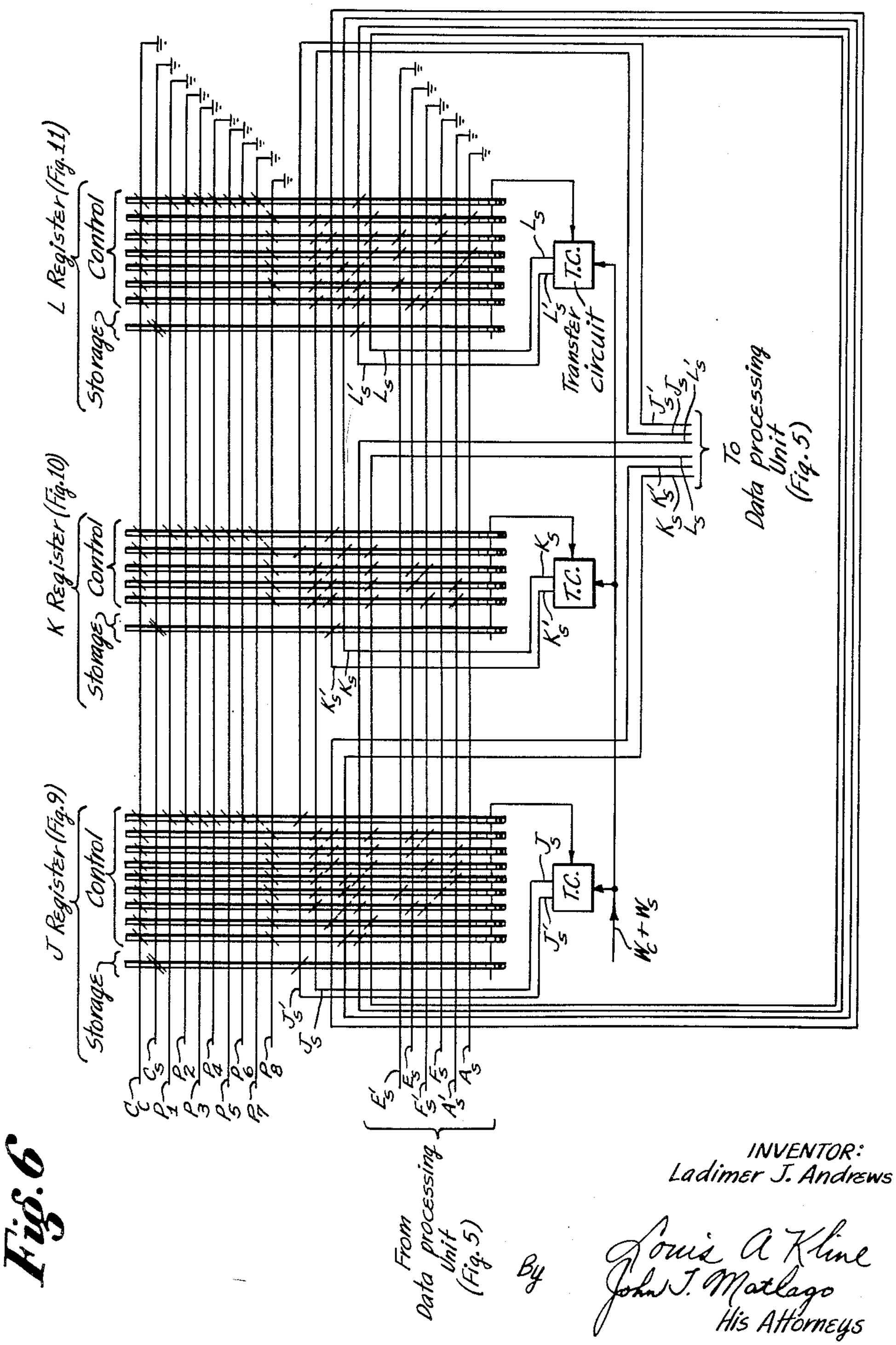

FIG. 6 is a schematic diagram of the programming unit.

Figure 6A:
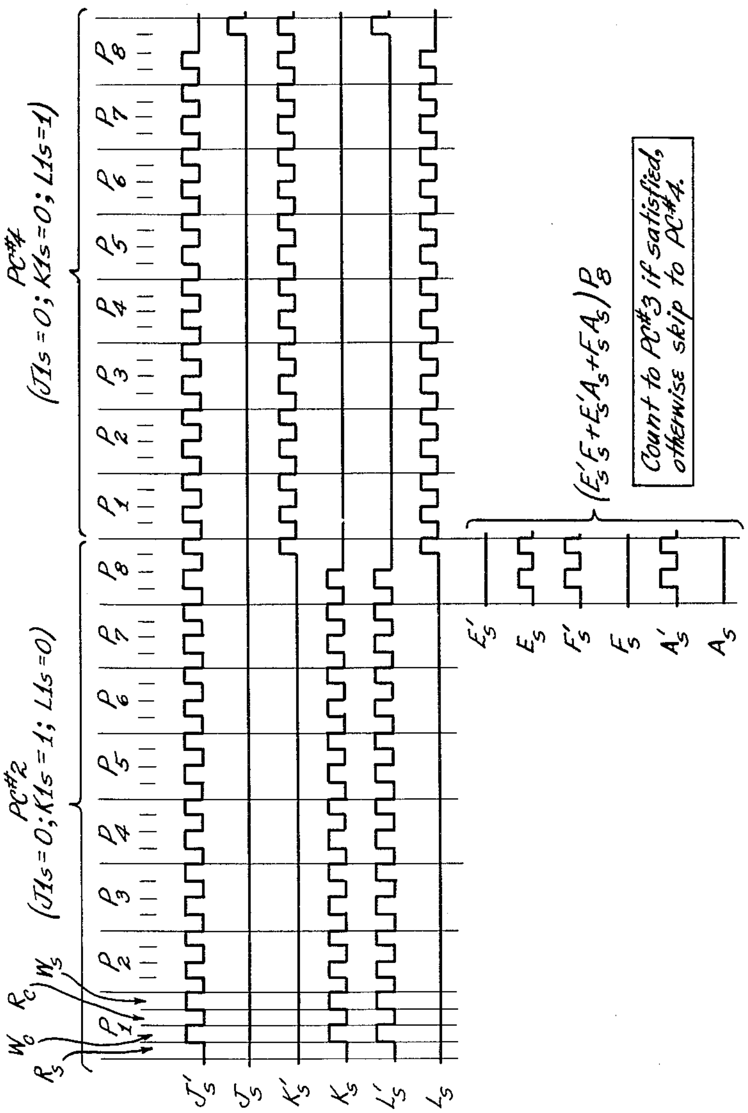

FIG. 6*a* is a graph illustrating the operation of the programming unit.

Figure 7:
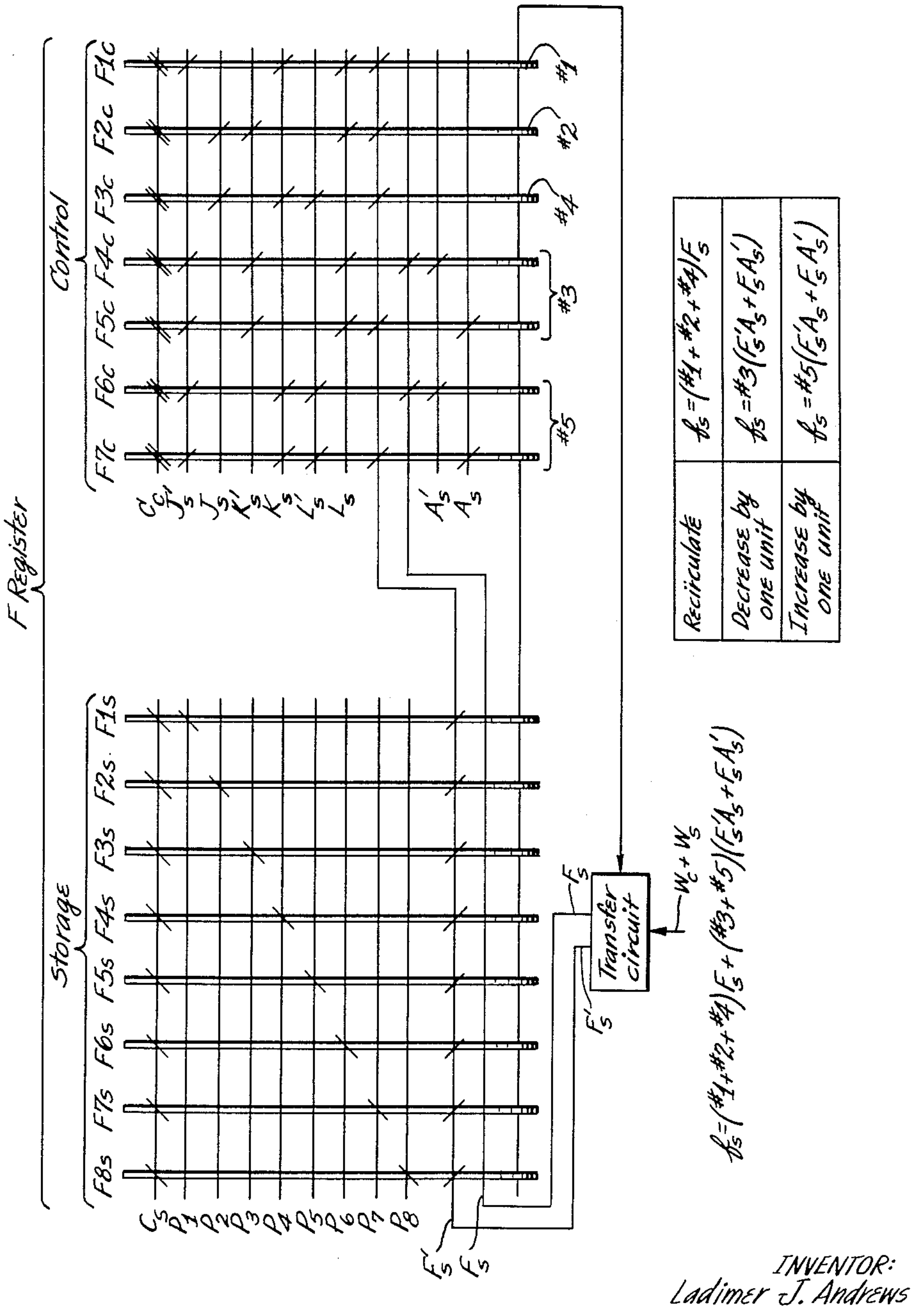

FIG. 7 is a schematic diagram of the F register of the data processing unit.

Figures 8, 12:
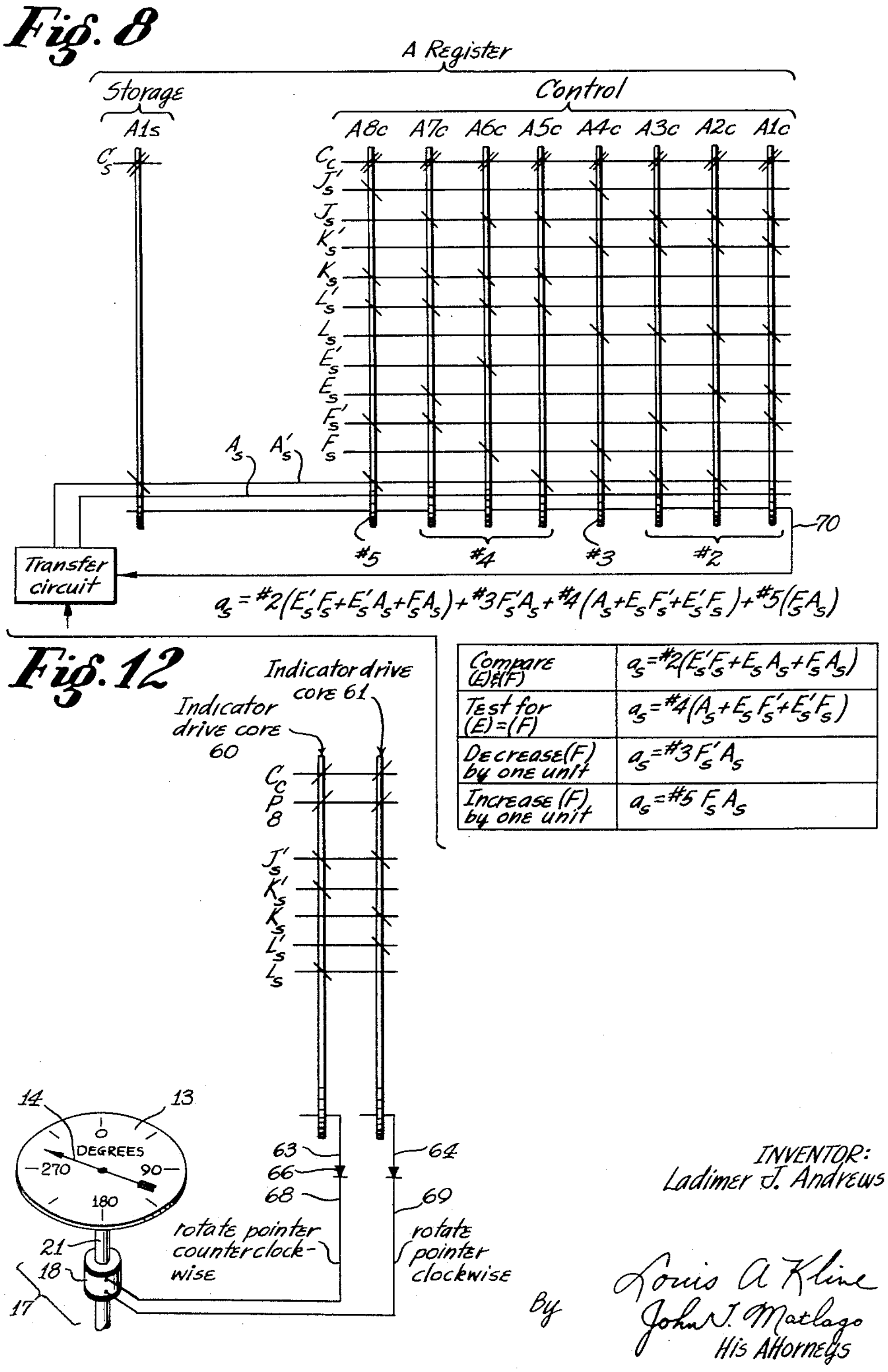

FIG. 8 is a schematic diagram of the A register o the data processing unit.

Figure 9:
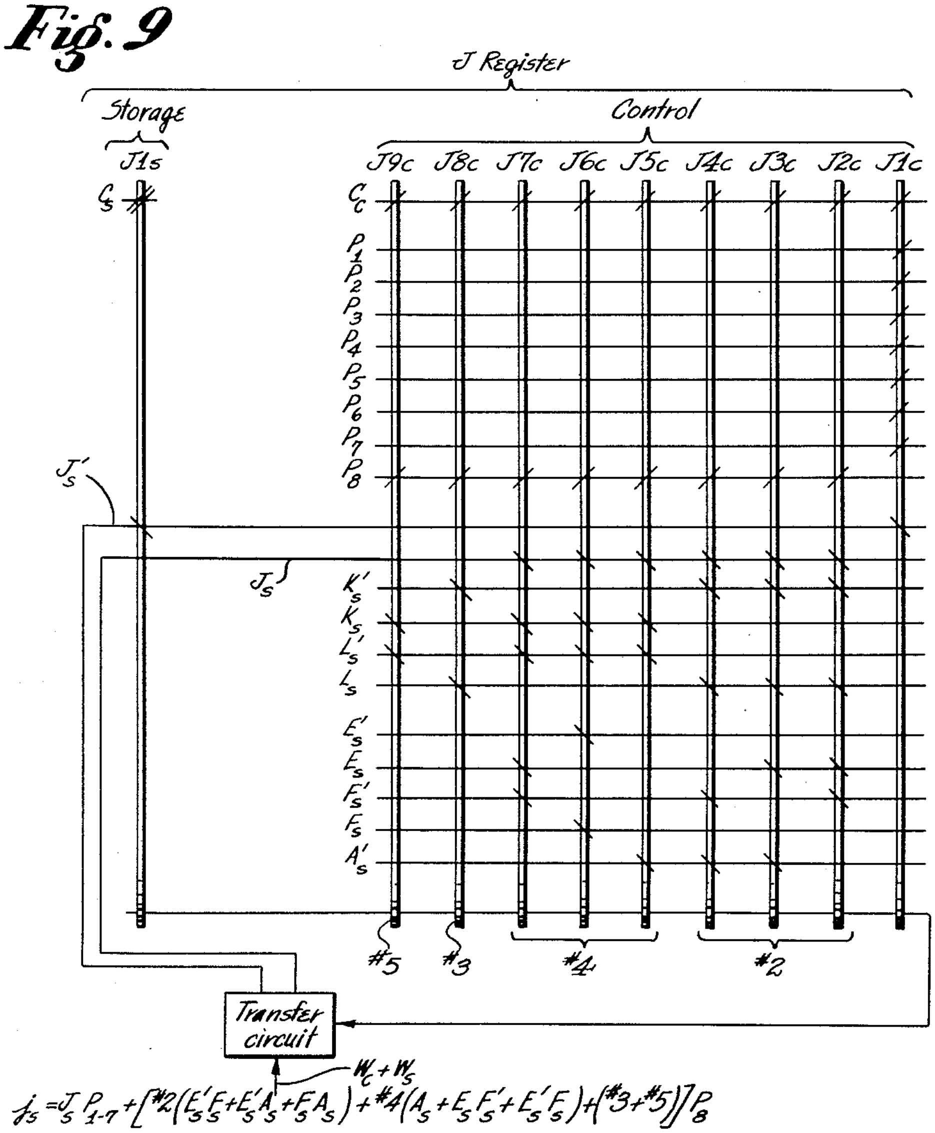
Figure 10:
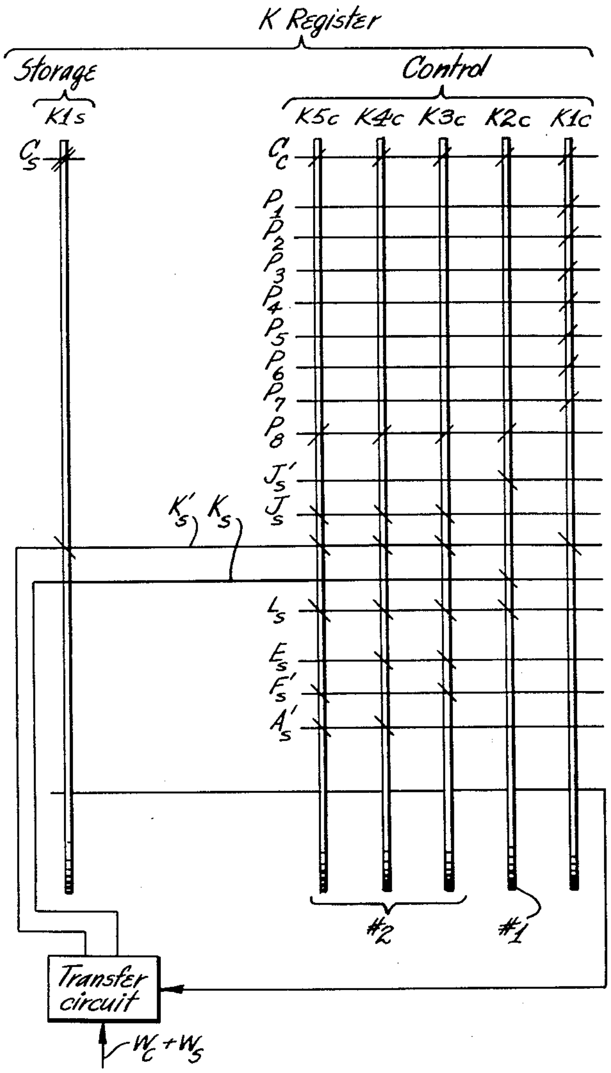
Figure 11:
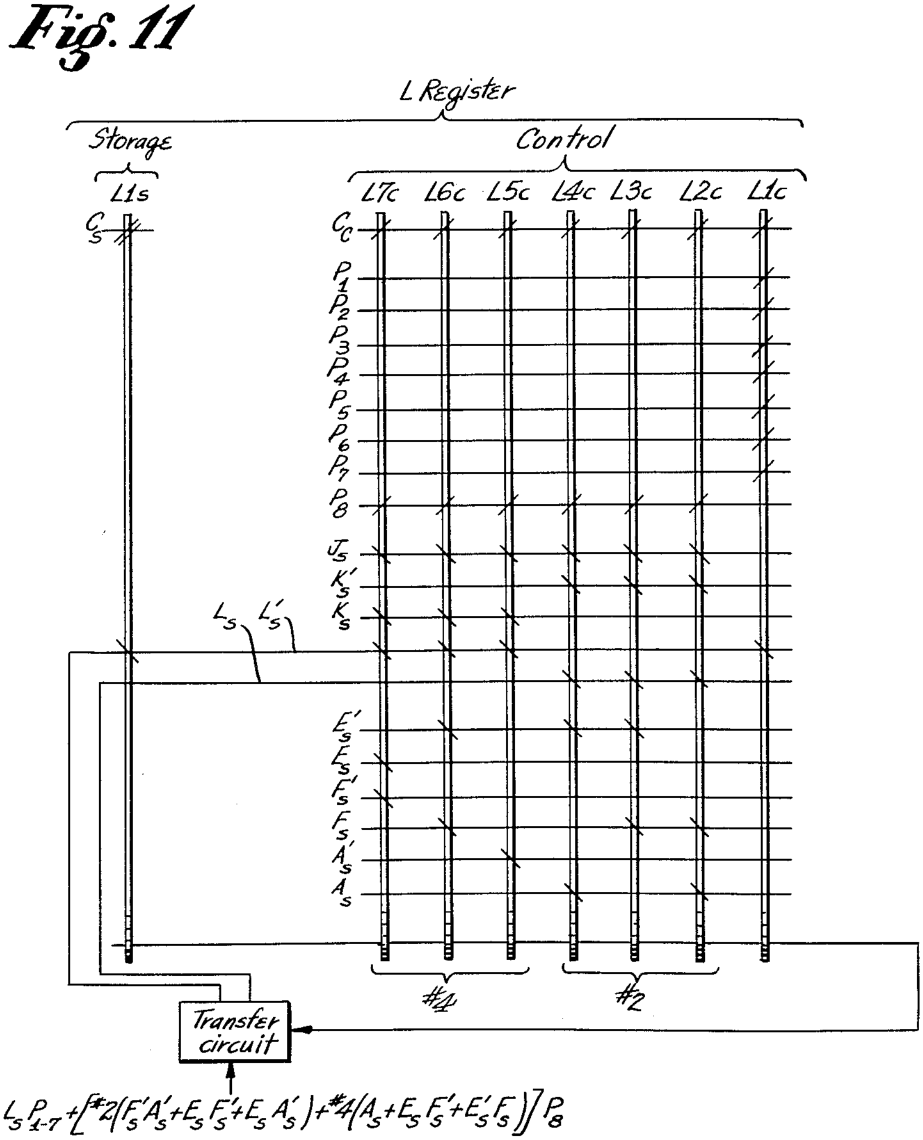

FIGS. 9, 10, and 11 are schematic diagrams of the J, K, and L registers, respectively, of the programming unit.

FIG. 12 is a schematic diagram of the output circuitry for the data processing unit utilized for driving the indicating device.

Figure 1:
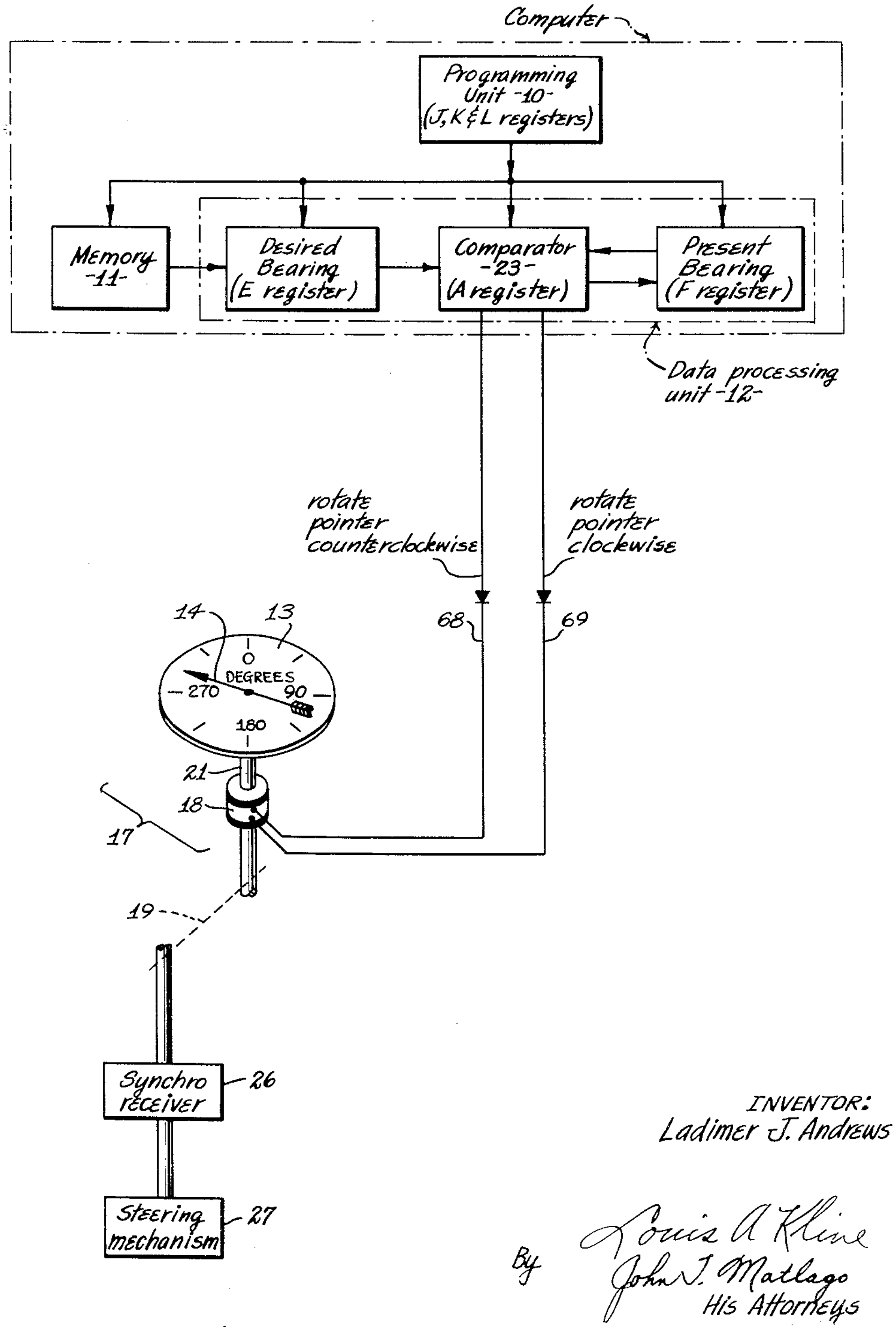
FIG. 1 is an overall block diagram of an embodiment of the invention.
Figure 2:
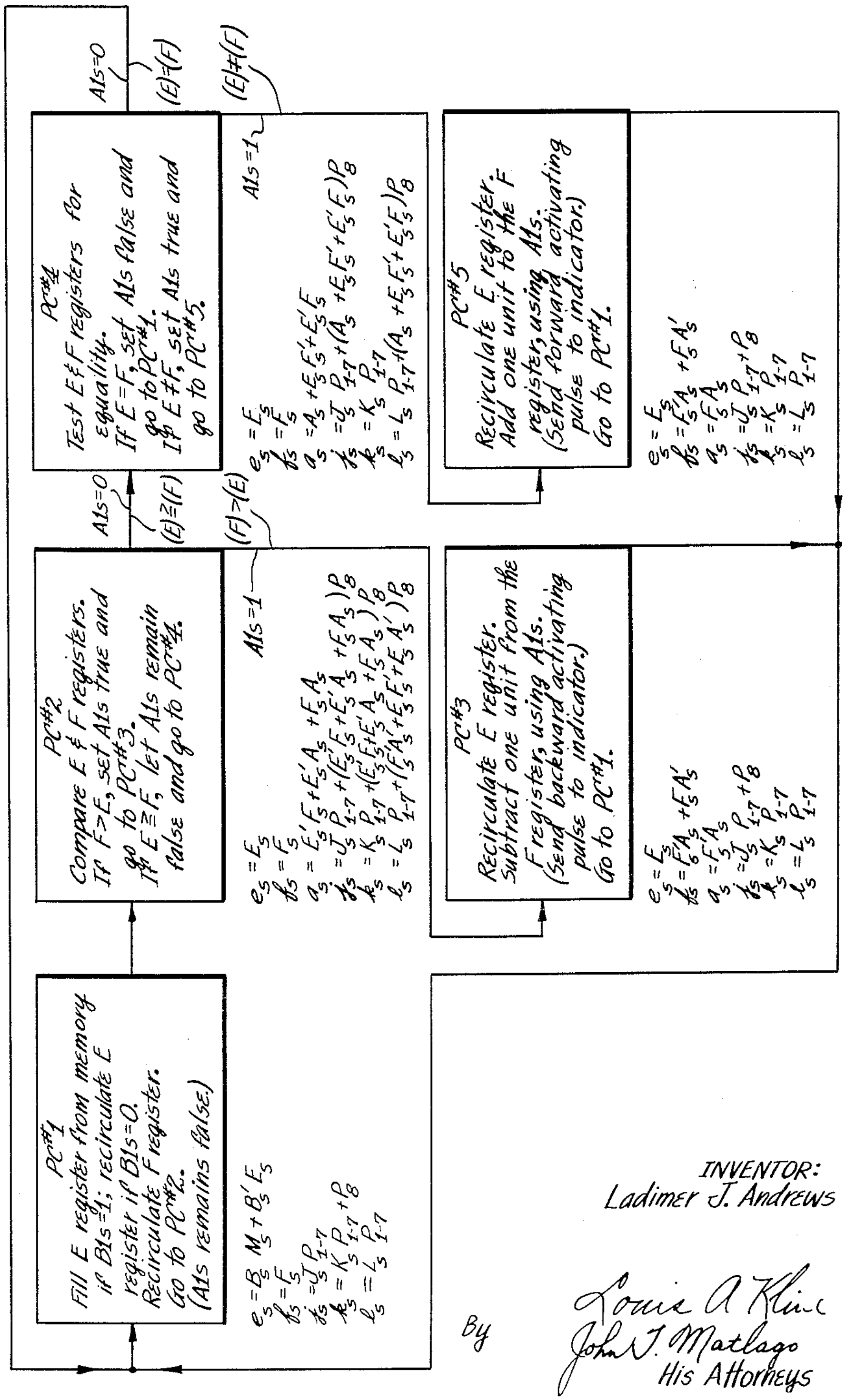
FIG. 2 is a flow diagram of the routine of the invention.

Generally, as shown in FIG. 1, the present invention, in the preferred embodiment, provides circuitry for generating pulse-type signals effective to alter the rotational setting of the shaft of an indicating device 17, for example. Indicating device 17 includes a conventional pulse-actuated bi-directional stepping motor, such as is disclosed in an article entitled "A Bi-Directional Pulse Totalizer for Control and Telemetry," by H. Dudley Wright, published in the "Convention Record" of the Institute of Radio Engineers, 1956. In accordance with the invention, signals representing, for instance, a desired bearing of a vehicle and consequently also representing a desired displacement of a synchro-transmitter shaft 21, to which is attached a pointer 14 capable of indicating degrees of bearing on an associated dial 13, are programmed to be stored in selected magnetic cores in the matrix memory 11 of a digital computer. The organization of the computer corresponds to the programming technique which involves, in essence, the scheduling of the presentation of information signals to the computer data processing unit 12 on a time division basis by a programming unit 10. Each step of the process represents a time interval, designated a word period, equal to that for any other step and is assigned a program count number (PC#). As shown in FIG. 2, an operation is performed by executing these steps in a predetermined sequence, said sequence including the repetition of steps or a subsequence of steps if required. Thus, during the word period designated as PC#1, the signals representing the desired bearing, i.e., the angular displacement of shaft 21 of indicating device 17 (FIG. 1), are read out of memory 11, where they have been stored, and are set up in a register, the E register of data processing unit 12. The E register operates in synchronism with a second register, the F register, in which signals representing the present bearing, i.e., the present shaft displacement, are stored. In PC#2 the two registers are compared by comparator 23 and, if the number represented by the F register set of signals is the larger, a unit subtraction is made therefrom in PC#3 and then PC#1 is reentered; but, if the number represented by the E register set of signals is equal to or greater than the latter, a test for equality of the signals is made in PC#4. If they are equal, no change is made in the content of the F register and PC#1 is reentered; if they are unequal, it is an indication that the set of signals in the F register is the smaller and PC#5 is entered. In PC#5, a unit addition is made to the set of signals in the F register, and then PC#1 is reentered. A voltage pulse is transmitted to indicating device 17 by way of conductor 69 in correspondence with the unit addition to the F register made in PC#5 or by way of conductor 68 in correspondence with the unit subtraction from the F register made in PC#3. Thus a unit alteration is made in the angular position of shaft 21, which change in position may be mechanically coupled by way of coupling 19 to a synchro-receiver 26 controlling the vehicle steering mechanism 27. The operations of the flow, i.e., the sequence from PC#1 to PC#2 to either PC#3 or PC#s 4 and 5, and from either PC#3 or PC#5 back to PC#1, are repeated until the signals in the E and F registers are equal, at which time shaft pointer 14 will indicate the desired bearing. The operational sequence from PC#1 to PC#2 to PC#4 and back to PC#1 is now repeated until a new desired bearing is read out of memory 11 into the E register. It should be evident that the number of cycles of operation through one of the above paths which cause alteration in the position of shaft 21 is equal to the initial difference, in the chosen units, between the present and desired indications and that each cycle provides a one unit addition or subtraction and one voltage pulse to indicating device 17. It is further evident that new numbers can be entered for indicating into the flow from memory 11 as rapidly as maneuvering conditions of the vehicle may warrant, since the time required for a computer excursion through the flow is a small fraction of the time required for a maneuver condition to become evident.

The present computing system utilizes the magnetic core both for the storage of binary digits and in the logical circuitry. The magnetic core is used as a bistable state device and, for best results, the magnetic material, of which each core is composed, is distinguished preferably by having a rectangular major hysteresis characteristic, i.e., B–H curve, such as the one shown in FIG. 3*a*. The states of bistability prevail after core saturation, and are the two polarities of core remanent magnetization, here designated "true" and "false," which will characterize the core indefinitely if no further excitation is applied.

The excitation, $H_M$, required to drive a core from one state of saturation, e.g., $-B_M$, to the other, e.g., $+B_M$, is critical, and the application of less than this critical excitation, although causing nominal excursion, nevertheless does not essentially change the prevailing polarity of saturation. However, upon the application of excitation at least equal to the critical value in a direction to cause the core to take on a polarity of saturation opposite to that presently existing, the polarity of saturation will abruptly "switch," as from the true state to the false state along the path of the descending arrow or from the false state to the true state along the path of the ascending arrow.

The present invention utilizes magnetic cores combined in a plurality of arrangements designated as "registers." To illustrate, FIG. 3 schematically shows the E register of data processing unit 12 (FIG. 1) together with the associated equipment required to carry out the logical processes involved in the invention. This equipment is employed also in conjunction with the other registers to be described later. The E register contains two arrays of cores, one array 25, comprising "storage" cores E1*s* to E8*s*, inclusive, being employed for storage of the binary digits to be manipulated, and the other array 28, comprising "control" cores E1*c* to E4*c*, inclusive, being employed for purposes of performing the manipulation of these digits. The register also includes transfer circuit 22 which functions to delay the information read out from the arrays and sets it up as an inhibiting signal capable of affecting the switching of cores in the E and other registers.

The utilization of magnetic cores as switching elements requires that they be driven from one state of remanent magnetization to the other by currents flowing in windings inductively coupled to the core structure. Still referring to FIG. 3, the present system obtains drive for the cores from three generators; two generators 38 and 40, supply "clock" signals $C_c$ and $C_s$ on conductors 35 and 37, respectively, and one generator 39, supplies timing signals $P_1$ to $P_8$ on conductors 36. An additional period signal generator 16 is employed to produce a pair of signals $W_c$ and $W_s$, which are gated to transfer circuit 2 by way of "or" gate 20. All generators are connected to pulse source 15.

The combination of a clock signal $C_c$ or $C_s$ and each timing signal $P_1$ to $P_8$ defines eight "digit transfer cycles" of equal duration, during each of which one binary digit being stored in one of the cores E1*s* to E8*s* is made available for arithmetic manipulation. Due to the nature of the clock and timing signals, to be described later, each digit transfer cycle is divided into a sequence of four equal time periods, designated as period $R_s$, period $W_c$, period $R_c$, and period $W_s$. During period $R_s$ the storage cores are interrogated, i.e., read out of; during period $W_c$ the control cores are set, i.e., written into; during period $R_c$ the control cores are interrogated; and during period $W_s$ the storage cores are set.

Still referring to FIG. 3, in the present system, each of the conductors, such as conductor 37 or conductor 41, supplying signals to the E register is connected to circuitry capable of generating a "half-current" of energy, i.e., half the excitation required to change the state of the core, or no excitation, i.e., zero current, at a particular time. Such conductors, which pass through and couple to a core with the same electrical sense so that currents therein are cumulative in their effect on the core polarity, are so indicated by diagonal marks across the cores in the same direction, such as diagonals 50 and 51 across core E5*s*. Such conductors which are poled oppositely to these are indicated by diagonal marks of opposite slope, such as diagonal 52 across core E5*s*.

Switching, therefore, can be accomplished by the coincident application of half-currents from two sources. As previously stated, these are a clock signal $C_s$ or $C_c$, and a digital selector signal $P_1, P_2, \ldots$ or $P_8$. Further, core switching can be prevented by the application, coincident with the above, of a half-current from one of several other sources, e.g., an "inhibiting" signal from transfer circuit 22, or from other transfer circuits to be described later.

A core, if in the false state, will be switched to the true state by half-currents in the same direction, left to right in FIG. 3, on one of the conductors 36 and on conductor 35 or conductor 37. A core, if true, will be switched false by coincident half-currents from right to left on these conductors. If it is understood that currents from left to right are positive and those from right to left are negative, it may be seen that for core E1*s*, for instance, only a positive half-current on each of the conductors carrying signals $P_1$ and $C_s$ flowing simultaneously can switch the core to the true state, and conversely only a negative half-current on each of these conductors flowing simultaneously can switch the core to the false state. It will be further understood that when a core is to be interrogated, it is supplied with full negative current so that its resulting condition is the false state, and that when a core is to be set, it is supplied with an uninhibited full positive current so that its resulting condition is the true state. Thus it follows that a negative half-current emitted simultaneously from storage clock signal generator 40 and from digit selector signal generator 39 can interrogate storage cores while a positive half-current emitted simultaneously from these generators can set storage cores. Similarly, as will be shown subsequently, a negative half-current emitted simultaneously from control clock signal generator 38 and from digit selector signal generator 39 can interrogate control cores while a positive half-current emitted simultaneously from these generators can set control cores. Also, it may be observed that a double diagonal 95 is employed to symbolize that signal $C_c$ is coupled twice through the control cores of the E register. This is to indicate that a half-current flowing in two loops of conductor 35 about each of these cores will suffice to switch them. A core matrix may be arranged in this way when, in accordance with its governing equation, a core is to be active during all digit transfer cycles making up the computer word. Conductors 41 and 42 connect outputs $E_s'$ and $E_s$ of transfer circuit 22 to cores of the E register and, as will be shown, to the control cores of all other registers. Similarly, conductors labelled to correspond with outputs from other register transfer circuits, such as $J_s'$, $K_s'$, etc., serve to connect their transfer circuits to the E register. Conductor 47 is coupled to all cores of the E register and conveys a pulse type signal to transfer circuit 22 whenever a core of the E register changes in polarity of magnetization.

FIG. 3 further indicates that the signals generated by signal generators 38, 39, and 40 are all driven from a common pulse source 15. Pulse source 15 may be a multivibrator or the like as are familiar to practitioners in the art. Additionally, it will be observed that "or" gate 20 is supplied with signals $W_c$ and $W_s$ by period signal generator 16. Generator 16 comprises a network arranged to provide the pulse outputs shown in synchronism with periods $W_c$ and $W_s$. "Or" gate 20 is arranged to provide a logical "or" signal ($W_c+W_s$) for gating the input to transfer circuit 22 so as to pass pulses on conductor 47 received only as a result of the change of state of a core during an interrogation period. Generator 16 and "or" gate 20 are also well known in the art and will not be further described.

FIGS. 7 through 11 show the details of the F, A, J, K, and L registers, respectively, of the computer. It will be noted that these registers, together with the E register of FIG. 3, are operative to perform the system of the invention. Cores of the registers are threaded by similarly labelled conductors. It will be understood that all conductors similarly labelled are connected in series and are terminated so as to provide closed circuitry with respect to their respective sources.

Reference will next be made to FIG. 5 showing the overall combination of the E register of FIG. 3 with the F and A registers shown in FIGS. 7 and 8, to provide the data processing unit 12 utilized in the present invention. As noted, each of the E, F, and A registers is provided with a transfer circuit. In addition, the storage and control cores of each register are threaded with clock signals $C_s$ and $C_c$, respectively, and timing signals $P_1$ to $P_8$ when appropriate. In addition, the outputs of the register transfer circuits, $E_s'$, $E_s$, $F_s'$, $F_s$, $A_s'$, and $A_s$, are made available for threading through the cores of their own and the other registers.

Data and control information input to data processing unit 12 is from memory 11 (FIG. 1). Data information is received by way of output $M_s'$ of a transfer circuit which is set up with data representing a new bearing as stored in memory 11. Control information, to indicate when the new bearing is to be set up in the E register, may originate in either memory 11 or at another source, and is received by way of outputs $B_s'$ and $B_s$, also preferably of a transfer circuit.

Output from data processing unit 12 is by way of two indicator drive cores 60 and 61, which are controlled to provide pulse outputs to drive indicating device 17.

FIG. 6 shows the J, K, and L registers comprising programming unit 10 for data processing unit 12 of FIG. 5. The cores of these registers are likewise each divided into storage and control cores and threaded with clock signals $C_s$ and $C_c$, respectively, and timing signals $P_1$ to $P_8$ when appropriate. The transfer circuit outputs, $J_s'$, $J_s$, $K_s'$, $K_s$, $L_s'$, and $L_s$, for these registers are threaded through the cores of their own and the other registers such that the outputs $J_s'$, $J_s$, $K_s'$, $K_s$, $L_s'$, $L_s$ from programming unit 10 have impressed thereon during each word period ($P_1$ through $P_8$) a unique combination of signals. As noted these outputs are routed to the cores of data processing unit 12 and thread the control cores thereof, thereby rendering certain of them effective during each program count #.

It should be further noted that the transfer circuit outputs of the E, F, and A registers of data processing unit 12 in FIG. 5 supply inputs to the cores of the programming unit 10 such that the advancement of this latter unit at the end of each word period is conditioned upon the results of operations by data processing unit 12 during the word period. The interaction of data processing unit 12 and programming unit 10 to provide for sequencing in accordance with the flow of FIG. 2 is exemplified by the graphs of transfer circuit outputs shown in FIG. 6*a*, which will be later discussed.

Referring now to FIG. 3*b*, here is shown the group of current waveforms, $C_s$, $C_c$, $P_1$ to $P_8$, which are generated synchronously and combined as shown for sequentially interrogating and setting cores through which the conductors carrying these signals are passed. Each is a square waveform of current having maximum values, such as at regions 54 and 55 of the signal $C_s$ wave, equal to the positive or negative half-current. These maximum values, for each case, exist for a time period somewhat in excess of the switching time required by the core material, and the phasing of the currents is such that, depending upon whether a core is used for storage or for control, it is interrogated at a coincidence of negative half-current of signal $C_s$ or $C_c$ with a negative half-current of signal $P_1$, $P_2$, . . . or $P_8$ during period $R_s$ or $R_c$ and is set at a coincidence of positive half-current of signal $C_s$ or signal $C_c$ with a positive half-current of signal $P_1$, $P_2$, . . . or $P_8$ during period $W_s$ or $W_c$.

The art is well versed in techniques for generating square wave signals of current such as signals $C_s$, $C_c$, and $P_1$ to $P_8$, inclusive. It should therefore suffice to point out that each of these is a recurrent square waveshape with excursions of half-current amplitude, when present on their respective conductors. It should be noted that signal $C_c$ is identical to signal $C_s$, but is shifted two periods with respect thereto, and that each of these signals are at the zero current level for half of the digit transfer cycle. Further, it should be observed that signals $P_1$, $P_2$, . . . and $P_8$ appear successively on their respective conductors, but whichever is presently effective is synchronized with the generation of signals $C_s$ and $C_c$, as shown. Thus it follows that each of these P signals prevails only during every eighth digit transfer cycle, but is equally effective in establishing, by combining with $C_s$ and $C_c$, the four iterative periods $R_s$, $W_c$, $R_c$, and $W_s$.

It has been pointed out in connection with FIG. 3 that pulse voltages induced on sense conductor 47, as a result of change in core state, comprise the input to the E register transfer circuit 22.

The block diagram of the transfer circuit 22 in FIG. 4 shows that voltage pulses carried by conductor 47 provide an input to amplifier 98. The phase of each of these pulses is negative, owing to the direction of threading conductor 47 through the cores. Amplifier 98 is gated to pass a signal on line 47 by a second input signal $W_c+W_s$ from "or" gate 20 (FIG. 3). This signal has the ability to cut off conduction in amplifier 98 during periods $W_c$ and $W_s$, and thus only signals on line 47 which occur during periods $R_s$ and $R_c$ appear in amplified form as the true input to a flip-flop 96. The false input to flip-flop 96 is the negative-going pulse obtained by differentiating the logical sum square waveform $W_c+W_s$. Flip-flop 96 is constructed in accordance with the familiar arrangement which permits triggering from one of its bistable states to the other by only negative-going voltage pulses applied alternatively to a pair of inputs. The actual triggering to the false state occurs as a result of the negative pulse produced by the fall of the waveforms at the termination of every $W_c$ and $W_s$ period. Thus flip-flop 96 may be triggered true during periods $R_s$ and $R_c$ as a result of a change in state of one of the E register cores; and, if so, this state will prevail until the end of periods $W_c$ and $W_s$, respectively.

Flip-flop 96 is characterized by two outputs. One output, on line 66, is high only when the flip-flop is in the true state and the other output, on line 74, is high only when the flip-flop is in the false state. Both outputs are amplified without inversion by identical amplifiers, the former by amplifier 71 and the latter by amplifier 72. Amplifiers 71 and 72 have their inputs also gated by signal $W_c+W_s$. However, due to the circuit arrangement of amplifiers 71 and 72, signals on lines 66 and 74, respectively, are passed only during periods $W_c$ and $W_s$, and conduction is cut off during periods $R_s$ and $R_c$. It should be noted that by this arrangement the signal read from the cores during an $R_s$ and $R_c$ period are effectively delayed and generated during the following $W_c$ and $W_s$ periods, respectively. The outputs of amplifiers 71 and 72, designated as outputs $E_s$ and $E_s'$, are of half core-switching amplitude current $i/2$. Conductors 41 and 42 pass through the register cores, being coupled to selected cores so that the delayed signals generated thereon may inhibit the setting of the cores during set periods $W_c$ and $W_s$, respectively.

FIG. 4*a* contains curves which further illustrate the operation of transfer circuit 22 for two representative digit transfer cycles. The successful interrogation of E register cores will be assumed during two successive interrogation periods $R_c$ and $R_s$, resulting in the shown negative pulses 80 and 82. Amplifier 98 is active during these periods and thus pulses 80 and 82 provide true triggering pulses 84 and 86, respectively, for flip-flop 96. However, at the fall of pulses $W_c$ and $W_s$, such as 87, 88, and 89, false triggering pulses are produced, such as pulses 90, 91, and 92, respectively, which reset flip-flop 96 to the false state. Output on line 66 becomes high coincident with pulses 84 and 86 and becomes low coincident with pulses 91 and 92, and output on line 74 becomes low coincident with pulses 84 and 86 and high coincident with pulses 91 and 92, respectively. Since amplifiers 71 and 72 are cut off during interrogation periods, it is during period $W_s$ of the first digit transfer cycle and period $W_c$ of the second digit transfer cycle, that output $E_s$ on line 42 is high and output $E_s'$ on line 41 is low. Thus, as a result of a change of state of an E register control core during period $R_c$ of the first digit transfer cycle, for instance, an inhibiting signal half-current 93 ($E_s$) is supplied at the output of the E register transfer circuit during the next period $W_s$; but where there is no change of state of an E register core, as during period $R_c$ of the second digit transfer cycle, there is an inhibiting signal half-current 94 ($E_s'$) supplied at the output of the E register transfer circuit during the next period $W_s$.

In the present system, handling of information in the storage cores of a register is serial, the information being arranged in a group consisting of a fixed number of binary digits. A group represents a number comprising eight binary digits and will be designated as a "word." A "word" consists of a sequence of eight binary digits; thus each of the E and F registers contains eight storage cores E1*s* to E8*s* and F1*s* to F8*s*, respectively, and each register may store a number. The storage scheme employed herein utilizes the register core with the lowest numerical prefix, such as cores E1*s*, to store the least significant digit of a number and the other cores of a register to store the other digits of the number in order of greater significance, core E8*s*, for example, being used to store the most significant digit of the binary number in the E register. Digits are read into or read out of a register also in order of significance, being selected by the timing signals $P_1$ to $P_8$; signal $P_1$ selects the digits in cores E1*s* and F1*s*, signal $P_2$ selects the digits in cores E2*s* and F2*s*, etc. Further, the time required for the sequence from signal $P_1$ to signal $P_8$ will be referred to as a word period. In summary, each word period is divided by the P signals into eight binary periods, designated as "digit transfer cycles," during each of which the condition of a core may be altered by the application of the P signal coincident with the application of signal $C_s$ or $C_c$, in accordance with the four sequential periods $R_s$, $W_c$, $R_c$, and $W_s$ comprising each digit transfer cycle, as already described.

Referring now to the flow diagram, FIG. 2, in the preferred system, processes are performed sequentially, each process being definable within a word period. It is the function of programming unit 10 (FIG. 6) to render various of the control cores operable during each word period in accordance with the logical equations defining the process. Accordingly, each output count signal, #1, #2, etc., of programming unit 10 indicates which of the control cores are operable during a word period.

The output count signals of programming unit 10 are composites of the read-out signals of pragramming storage cores J1*s*, K1*s*, and L1*s*, the states of which are determined by the control cores of the respective registers. The states of these control cores are, in turn, dependent on read-out signals of the cores of all registers, which signals cause the respective transfer circuits to generate inhibiting signals on conductors wound on these cores in accordance with the desired logical equations.

Table I shows the states of storage cores J1*s*, K1*s*, and L1*s* of programming unit 10 to produce each output count signal corresponding to the blocks in the flow diagram of FIG. 2. With reference to terminology employed in this specification, it will be understood that a core in the true state (FIG. 3*a*) will be considered to be storing a binary digit "one" while a core in the false state will be considered to be storing a binary digit "zero."

*Table I*

| | Programming Unit Storage Cores | | |
|---|---|---|---|
| | J1s | K1s | L1s |
| Stages | $2^0$ | $2^1$ | $2^2$ |
| PC#1 | 1 | 0 | 0 |
| PC#2 | 0 | 1 | 0 |
| PC#3 | 1 | 1 | 0 |
| PC#4 | 0 | 0 | 1 |
| PC#5 | 1 | 0 | 1 |

Each configuration of cores J1*s*, K1*s*, and L1*s* is maintained for one word period during which time the block functions, as expressed by the brief statements in the blocks and the equations thereunder, are being carried out. The output count signal from programming unit 10 is maintained for periods $P_1$ through $P_8$ of a word period (with the exception of the final period $W_s$ of $P_8$), and is subject to being changed at the end of the word period in accordance with the states of cores J1*s*, K1*s*, and L1*s* as evidenced during period $W_c$ of $P_8$ in order that the same or other control cores may become operable during the next word period. In summary, from Table I, if, for example, during periods $P_1$ through $P_8$ of a word period, core K1*s* is true and cores J1*s* and L1*s* are false, the processes laid down in PC#2 of FIG. 2 are being performed. Depending on the outcome of these processes, core A1*s* will be set true or permitted to remain false. During period $W_s$ of $P_8$ of this word period, cores J1*s*, K1*s*, and L1*s* will be reset depending upon the final state of core A1*s*. Thus cores J1*s* and K1*s* may be true and core L1*s* may be false (PC#3) or cores J1*s* and K1*s* may be false and core L1*s* may be true (PC#4) during periods $P_1$ through $P_8$ of the succeeding word period. To illustrate, with reference to FIG. 2, if, in PC#2, the F register number is greater than the E register number, cores A1*s* and J1*s* will be set true and cores K1*s* and L1*s* will remain as before (true and false, respectively), corresponding to PC#3. If, however, the E register number is equal to or greater than the F register number, cores A1*s* and J1*s* will remain false and cores K1*s* and L1*s* will change state (to false and true, respectively), corresponding to PC#4.

Before going into the details of FIG. 2, it is appropriate to briefly review the operation of the registers in performing various logical processes, using the E register of FIG. 3 as illustrative.

With regard to storage cores E1*s* and E8*s*, it is seen that these may switch only at succeeding periods from period $P_1$ (the core E1*s* digit transfer cycle) to $P_8$ (the core E8*s* digit transfer cycle), and all are affected by inhibiting signal $E_s'$. Considering core E1*s* as exemplary, it will be understood that all control cores E1*c* to E4*c* may affect the switching of core E1*s*; cores E1*c* and E2*c* during PC#1, core E3*c* during PC#*s* 2 and 3, and core E4*c* during PC#*s* 4 and 5. Core E3*c* is also affected by signal $E_s'$. Thus, still using the word period of PC#2 as illustrative, information set up in core E1*s* will be read out at period $R_s$ of digit transfer cycle $P_1$, which, for simplicity, will be designated as period $P_1R_s$. The information will then be set up in core E3*c* at period $P_1W_c$, read out of core E3*c* at period $P_1R_c$, and reset in core E1*s* at period $P_1W_s$. In other words, information existing in core E1*s* will be restored in core E1*s*. If however, it were desired that information in core E1*s* be complemented during period $P_1$, regardless of its initial state, it is only necessary that signal $E_s'$ be coupled to core E1*s* and that the opposite output, $E_s$, of transfer circuit 22 be utilized as inhibiting signal for core E3*c*. With this arrangement, regardless of the initial state of core E1*s*, its state at the end of period $P_1$ will be the opposite, or, in other words, information in core E1*s* is complemented. These and other logical processes are summarized in Table II.

*Table II*

| Logical Function | Inhibiting Signals | | Equation |
|---|---|---|---|
| | Storage Core | Control Core | |
| Resoration | $E_s'$ | $E_s'$ | $e_s=E_s$ |
| Complementation | $E_s'$ | $E_s$ | $e_s=E_s'$ |
| Fill with "zero" | $E_s'$ | No core Required. | $e_s=0$ |
| Fill with "one" | $E_s'$ | Not inhibited | $e_s=1$ |
| Transfer from M1*s* | $E_s'$ | $M_s'$ | $e_s=M_s$ |
| Transfer complement of M1*s* | $E_s'$ | $M_s$ | $e_s=M_s'$ |
| Transfer from M1*s* if B1*s* is true | $E_s'$ | $M_s'B_s'$ | $e_s=M_sB_s$ |

With reference to the core designations, it will be understood that the true state of core E1*s* will be represented by a symbol such as $E_{1s}$, and the signal or combination of signals which permits a core to be set to this state will be $e_{1s}$; the false state of this core will be represented by a symbol such as $E_{1s}'$, and the signal which sets a core to this state will be ${}_0e_{1s}$. However, since the transfer circuit for a register is set up with data read from the storage cores E1*s*, E2*s*, etc., in turn, the outputs of the E register transfer circuit, $E_s$ and $E_s'$, generally represent data read from any of these cores.

It will be further understood that the computer contemplated here contains a core memory, read-in and read-out techniques therefor being well established. It may thus be assumed that a signal $B_s$ is provided (at the half-current level) when a new indication on indicating device 17 (FIG. 5) is desired and read out from the memory, and a signal $B_s'$ is provided as long as no new indication is desired. Similar to the other inhibiting signals which may affect core switching, signals $B_s$ and $B_s'$ may be the outputs of a transfer circuit, as shown.

Also, it will be understood that the process of reading information out of the core memory is arranged such that a memory core M1*s* changes state in correspondence with the information being read out. Therefore, if, for instance, the E register is to be filled from the memory, during a $P_n$ digit transfer cycle, information read by interrogation of core M1*s* during period $R_s$ is set up in an E register control core during period $W_c$, is then read by interrogation of the control core during period $R_c$ and, finally, is set up in the $P_n$ activated storage core during period $W_s$.

The details of FIG. 2 will next be referred to in explaining the operation of the system of the invention.

It will first be recalled that, if a new number representing a desired indication of indicating device 17 (FIG. 1) is not ordered to be read from memory 11, the sequence from PC#1 to PC#2 to PC#4 and back to PC#1 will be repeated continuously by the circuit of the present invention. However, if a new number is ordered to be read from memory 11, the sequence from PC#1 to PC#2 to PC#3 to PC#1 or the sequence from PC#1 to PC#2 to PC#4 to PC#5 to PC#1 will be performed a number of times corresponding to the difference between the present indication and the desired indication.

Referring specifically to PC#1, this word period is distinguished by the fact that storage cores J1*s*, K1*s*, and L1*s* of the J, K, and L registers, respectively, of programming unit 10 are characterized by the states shown in the first row in Table I, previously introduced. Thus, during this word period, cores E1*c* and E2*c* of the E register (FIG. 3) are not inhibited from switching by signals from the registers of programming unit 10, whereas cores E3*c* and E4*c* are so inhibited. Since this type of core selection is used for program control, Table III accordingly lists the control cores of the E, F, and A registers (FIGS. 3, 7, and 8, respectively) in association with the PC# for which they are not inhibited.

*Table III*

| | Control Cores Not Inhibited | | |
|---|---|---|---|
| | E Register | F Register | A Register |
| PC#1 | E1*c*; E2*c* | F1*c* | |
| PC#2 | E3*c* | F2*c* | A1*c*; A2*c*; A3*c*. |
| PC#3 | E3*c* | F4*c*; F5*c* | A4*c*. |
| PC#4 | E4*c* | F3*c* | A5*c*; A6*c*; A7*c*. |
| PC#5 | E4*c* | F6*c*; F7*c* | A8*c*. |

It is the main function of PC#1 to set up the E register storage cores E1*s* to E8*s* (FIG. 3) with the digits of a new bearing read out from memory 11. As stated, this is done only if core B1*s* is true. Referring to FIG. 3, if core B1*s* is false, during period $P_1R_s$, no pulse will trigger the transfer circuit (FIG. 5) associated with core B1*s* and signal $B_s'$ will thus inhibit core E1*c* from switching during period $P_1Wc$; however, core E2*c* will not be so inhibited and thus will be set or not during period $P_1Wc$ in accordance with the state of core E1*s*. The activity of cores E2*s* to E8*s* during their respective digit transfer cycles is similar. Thus, if core B1*s* is false during the word period of PC#1, core E2*c* will effectuate the restoration of information in cores E1*s* to E8*s*. For example, if the symbol E*s* is employed to generically designate any of the cores E1*s* to E8*s*, and the symbol $e_s$ is employed to designate the application of full switching current to any of these cores, and the symbols $E_s$ and $E_s'$ used to designate a true and false state, respectively, of any of these cores, the equation for this activity is: $e_s=B_s'E_s$. On the other hand, if core B1*s* is true during period $P_1R_s$, there will be a pulse to the transfer circuit associated with core B1*s*. It follows that during period $P_1Wc$, signal $B_s$ will inhibit core E2*c* from switching; however, core E1*c* will not be so inhibited and thus will be set or not in accordance with the state of core M1*s* (FIG. 5), since the output $M_s'$ of the transfer circuit associated with core M1*s* affects core E1*c*. Thus, if core B1*s* is true during the word period of PC#1, core E1*c* will cause the entry of the information of core M1*s* into cores E1*s* to E8*s*; the generic equation for this activity is written $e_s=B_sM_s$. In summary, the composite E register Boolean equation for PC#1 is $e_s=B_sM_s+B_s'E_s$. It is noted from FIG. 3 that the first term $B_sM_s$ of this equation is mechanized by core E1*c* while the second term $B_s'E_s$ of this equation is mechanized by core E2*c* as follows. The equation is seen to comprise the sum (logical "or") of two product (logical "and") terms and may be logically manipulated to the equivalent expression $$e_s=(B_s'+M_s')'+(B_s+E_s')'$$

Core E1*c* mechanizes the sum $(B_s'+M_s')$ since the false outputs of the transfer circuits associated with cores B1*s* and M1*s* are inhibit wound to this core. Similarly, core E2*c* mechanizes the sum $(B_s+E_s')$ since the true output of the core B1*s* transfer circuit and the false output of transfer circuit 22 are inhibit wound to this core. The primes of these sums are accomplished by the inhibit type of winding in which currents act to cancel the effect of current in the C*c* signal winding 35, and the formation of the final sum is accomplished by common sense winding 47.

PC#1 further provides for restoration of the F register information, represented by the equation $f_s=F_s$. This is required since, as will be recalled, the F register holds a number corresponding to the present setting of indicating device 17, and this number must be retained for the comparison in PC#2.

The next statement made in PC#1 directs that the registers of programming unit 10 be arranged such that the processes of PC#2 be performed during the succeeding word period. It should be evident at this time that the equations $j_s=J_sP_{1-7}$, $k_s=K_sP_{1-7}$, and $l_s=L_sP_{1-7}$ retain the arrangement "100" set up in cores J1*s*, K1*s*, and L1*s* during $W_s$ of these periods to distinguish the word period of PC#1 shown in Table I. This is maintained for periods $P_1W_s$ to $P_7W_s$, inclusive, by cores J1*c* (FIG. 9), K1*c* (FIG. 10), and L1*c* (FIG. 11). Period $P_8W_s$ is utilized to change to the "010" arrangement which distinguishes PC#2. It is thus necessary to switch core J1*s* false and core K1*s* true. Core J1*s* is switched false at period $P_8W_s$, since no control core is provided for affecting core J1*s* for this period (FIG. 9) and, as shown by Table II, this condition will cause the filling of a zero. A similar arrangement in the L register (FIG. 11) permits core L1*s* to remain false. Core K1*s* is set true at period $P_8W_s$, since control core K2*c* is not inhibited at this time (FIG. 10), and this condition will cause the filling of a one.

The last statement of PC#1 indicates that core A1*s* remains false. The A register (FIG. 8) will be later discussed. It will suffice at present to indicate that core A1*s* enters and leaves the word period of PC#1 in the false state.

During the word period of PC#2, the numbers in the E and F registers are compared and core A1*s* is set to indicate the result of the comparison as follows. If the F register number is the greater, core A1*s* is set true, otherwise it remains false. If core A1*s* is true at period $P_8W_s$, the routine will advance to PC#3 but if core A1*s* is false at period $P_8W_s$, the routine will advance to PC#4.

In order that the comparison be made, the numbers in the E and F registers are made available by recirculation, represented by the equations $e_s=E_s$, $f_s=F_s$, the E register by core E3*c* (FIG. 3) and the F register by core F2*c* (FIG. 7) which, as shown in the PC#2 row in Table III, are active during this word period.

The digits (states of cores E1*s* to *E8s* and F1*s* to F8*s*) are compared, as these cores are interrogated, and reset during the corresponding P periods. It has been pointed out that core A1*s* enters PC#2 in the false state. The scheme of the comparison is to set core A1*s* true if an E register storage core is storing a one and the corresponding F register core is storing a zero, and to set core A1*s* false if the E register storage core is storing a zero and the corresponding F register storage core is storing a one; otherwise, core A1*s* is not to be changed. This comparison is given for all possible states of the E and F register storage cores and core A1*s* in Table IV.

*Table IV*

| Core Es | Core Fs | Core A1s | | Logic $_oa_s$ and $a_s$ |
|---|---|---|---|---|
| | | Prior to a P Period | After a P Period | |
| 0 | 0 | 0 | 0 | $E_s'F_s'A_s'$ |
| 0 | 0 | 1 | 1 | $E_s'F_s'A_s$ |
| 0 | 1 | 0 | 1 | $E_s'F_sA_s'$ |
| 0 | 1 | 1 | 1 | $E_s'F_sA_s$ |
| 1 | 0 | 0 | 0 | $E_sF_s'A_s'$ |
| 1 | 0 | 1 | 0 | $E_sF_s'A_s$ |
| 1 | 1 | 0 | 0 | $E_sF_sA_s'$ |
| 1 | 1 | 1 | 1 | $E_sF_sA_s$ |

Thus the equation determining the true state of core A1*s* after a digit transfer cycle is:

$$a_s=E_s'F_s'A_s+E_s'F_sA_s'+E_s'F_sA_s+E_sF_sA_s$$

which reduces, by logical manipulation, to $$a_s=E_s'F_s+E_s'A_s+F_sA_s$$

From Table III and FIG. 8, it is seen that control cores A1*c*, A2*c*, and A3*c*, respectively, accomplish the mechanization of the terms of the above equation, the common sense conductor 70 effectively providing the logical sum of the terms.

With reference to output of programming unit 10, the information (Table I) in cores J1*s*, K1*s*, and L1*s* is recirculated during periods $P_1$ to $P_7$ in order to maintain the PC#2 count. If the comparison has indicated that $(F)>(E)$, it is desired that the next word period be PC#3; this condition requires only that core J1*s* be set true during period $P_8$. However, if the comparison has indicated that $(E)\geqq(F)$, it is desired that the next word period be PC#4; this condition requires that the states of cores K1*s* and L1*s* be complemented during period $P_8$. In other words, the result of the comparison determines how the information in cores J1*s*, K1*s*, and L1*s* is to be changed during period $P_8$. Since the condition determining a true state of cores J1*s* and K1*s* is the same as that determining the state of core A1*s*, the same equation terms may be employed to represent the activity of cores J1*s* and K1*s* during period $P_8$ as was employed for core A1*s*, namely, $$j_s=k_s=(E_s'F_s+E_s'A_s+F_sA_s)$$

Core L1*s*, however, must remain false if $(F)>(E)$ (i.e., if core A1*s* is set true) and is set true if $(E)\geqq(F)$ (i.e., if core A1*s* remains false) and thus is governed during period $P_8$ by terms of Table IV corresponding to a false state in core A1*s* after a digit transfer cycle. From Table IV, the equation is therefore $$l_s=E_s'F_s'A_s'+E_sF_s'A_s'+E_sF_s'A_s+E_sF_sA_s'$$

which reduces to: $l_s=F_s'A_s'+E_sF_s'+E_sA_s'$.

It is noted that cores J2*c*, J3*c*, and J4*c* of FIG. 9 and cores K3*c*, K4*c*, and K5*c* of FIG. 10 are employed to form the respective terms of the $j_s$ and $k_s$ equations while cores L2*c*, L3*c*, and L4*c* of FIG. 11 are employed to form the respective terms of the $l_s$ equation.

Referring to FIG. 6*a*, here are shown graphs of the waveshape outputs of the transfer circuits of programming unit 10 (FIG. 6) for the specific case of a sequence from PC#2 to PC#4. It is evident that recirculation of the PC#2 content (010) and the PC#4 content (001) of cores J1*s*, K1*s*, and L1*s*, respectively, occurs for periods $P_1$ through $P_7$ of each word period. Further, during period $P_8$ of PC#2, it is noted that for this case the outputs of the E, F, and A register transfer circuits do not satisfy the equation representing a count to PC#3. Therefore, sequencing to PC#4 will occur.

Considering the word period of PC#3, it is required that a unit be here subtracted from the number stored in the F register; core A1*s* is utilized in the subtraction. Table V may be referred to in order to develop the equations representing the subtraction.

*Table V*

| Initial Status of Cores | | Final Status of Cores | | Logic | |
|---|---|---|---|---|---|
| Fs | A1s | Fs | A1s | $f_s$ | $a_s$ |
| 0 | 0 | 0 | 0 | ---------- | ---------- |
| 0 | 1 | 1 | 1 | $F_s'A_s$ | $F_s'A_s$ |
| 1 | 0 | 1 | 0 | $F_sA_s'$ | ---------- |
| 1 | 1 | 0 | 0 | ---------- | ---------- |

From Table V it is noted that the equation specifying that an F register store core be set true is $$f_s = F_s'A_s + F_sA_s'$$

and the equation specifying that core A1*s* be set true is $a_s = F_s'A_s$. The terms of the former equation are developed by cores F4*c* and F5*c* of FIG. 7 while the term of the latter equation is developed by core A4*c* of FIG. 8.

The logic of PC#3 will effectuate a unit subtraction from the number in the F register. It is also necessary to generate a pulse signal to cause backward activation of indicating device 17 so that pointer 14 will read correctly. As shown in FIG. 12, this pulse is provided on conductor 63 by indicator drive core 60 during period $P_8W_c$ when core 60, which is normally false, is set true. The direction in which conductor 63 is wound through core 60 provides for a positive voltage pulse. This pulse is conducted through diode 66 and via conductor 68 to activator 18 of indicating device 17. Activator 18 has the ability to reposition shaft 21 counterclockwise in response to a pulse on conductor 68 or clockwise in response to a pulse on conductor 69. It should be noted that during period $P_8R_c$ of PC#3, a negative pulse will appear on conductor 63 when core 60 is interrogated. It is the function of diode 66 to block this pulse from entering activator 18.

With regard to program control for PC#3, the J1*s*, K1*s*, and L1*s* equations (FIG. 2) indicate that the content of these cores is recirculated during periods $P_1$ to $P_7$. During period $P_8W_s$, in order to change the output of programming unit 10 from 110 (Table I) to 100 (for PC#1), core J1*s* is set true by not inhibiting core J8*c* (Table II and FIG. 9) and cores K1*s* and L1*s* are set false by not utilizing control cores during this period.

Still with reference to FIG. 2, in the event the test made in PC#2 shows that $(E) \geq (F)$, core A1*s* is set false and the output of programming unit 10 is set up for PC#4. During this word period, a further test is made to determine whether $(E) = (F)$. If $(E) = (F)$, core A1*s* will be set false and the output of programming unit 10 will be arranged for PC#1 once more, since it is not necessary to change the content of the F register. If, however, $(E) \neq (F)$, this is an indication that the E register number exceeds that in the F register. When this condition prevails, core A1*s* will be set true and the output of programming unit 10 will be arranged for PC#5, which, as will be shown, provides for a unit being added to the content of the F register and a positive pulse being transmitted to activator 18 of indicating device 17 via conductor 69 (FIG. 12).

Regarding Table IV again, then, and considering the states of the E and F register storage cores which combine with a true state of core A1*s* or for which (E) is not equal to (F), the equation governing a true state of core A1*s* may be written:

$$a_s = E_s'F_s'A_s + E_s'F_sA_s' + E_s'F_sA_s + E_sF_sA_s + E_sF_s'A_s' + E_sF_s'A_s$$

which reduces to: $a_s = A_s + E_sF_s' + E_s'F_s$.

Referring to FIG. 8, it is noted that cores A5*c*, A6*c*, and A7*c* mechanize the respective terms of this equation.

Program control for PC#4 requires that the 001 content (Table I) of cores J1*s*, K1*s*, and L1*s* be recirculated during periods $P_1$ to $P_7$. If PC#5 is to be set up for the next word period, as shown by a final true state of core A1*s*, core J1*s* must be set true, core L1*s* must remain true, and core K1*s* remains false. If, however, PC#1 is to be set up for the next word period, as shown by a final false state of core A1*s*, the content of cores J1*s* and L1*s* must be complemented and core K1*s* remains false. Thus, during period $P_{8'}$ cores J1*s* and L1*s* are governed by the same equation as core A1*s*. Referring to FIGS. 9 and 11, it is seen that cores J5*c*, J6*c*, and J7*c* of the former and cores L5*c*, L6*c*, and L7*c* of the latter mechanize this equation. Core K1*s* is set false since no control core is provided in the K register (FIG. 10) for period $P_8$ of PC#4.

Considering now the word period of PC#5, it is required that a unit be here added to the number stored in the F register; core A1*s* is utilized in the addition. Table VI may be referred to in order to develop the equations representing the addition.

*Table VI*

| Initial Status of Cores | | Final Status of Cores | | Logic | |
|---|---|---|---|---|---|
| Fs | A1s | Fs | A1s | $f_s$ | $a_s$ |
| 0 | 0 | 0 | 0 | ---------- | ---------- |
| 0 | 1 | 1 | 0 | $F_s'A_s$ | ---------- |
| 1 | 0 | 1 | 0 | $F_sA_s'$ | ---------- |
| 1 | 1 | 0 | 1 | ---------- | $F_sA_s$ |

From Table VI it is noted that the equation specifying that an F register storage core be set true is $$f_s = F_s'A_s + F_sA_s'$$

and the equation specifying that core A1*s* be set true is $$a_s = F_sA_s$$

The terms of the former equation are developed by cores F6*c* and F7*c* of FIG. 7 while the term of the latter equation is developed by core A8*c* of FIG. 8.

The logic of PC#5 will effectuate a unit addition to the number in the F register. It is also necessary to generate a pulse signal to cause forward activation of indicating device 17 so that pointer 14 will read correctly. As shown in FIG. 12, this pulse is provided on conductor 64 by indicator drive core 61 in the same fashion as discussed for the activity of core 60 during PC#3.

With regard to program control for PC#5, the J1*s*, K1*s*, and L1*s* equations (FIG. 2) indicate that the content of these cores is recirculated during periods $P_1$ to $P_7$. During period $P_8W_s$, in order to change the output of programming unit 10 from 101 (TABLE I) to 100 (for PC#1), core J1*s* is set true by not inhibiting core J9*c* (Table II and FIG. 9) and cores K1*s* and L1*s* are set false by not utilizing control cores during this period.

Still referring to FIG. 2, an example of the operation of the system of the present invention will next be given. It will be presumed that initially the E register content is 53 and that previous sequences through the flow of FIG. 2 have occurred a sufficient number of times so that the F register content and the reading of indicating device 17 are also at 53:

| | | | | | | | | |
|---|---|---|---|---|---|---|---|---|
| E register cores | E8s | E7s | E6s | E5s | E4s | E3s | E2s | E1s |
| F register cores | F8s | F7s | F6s | F5s | F4s | F3s | F2s | F1s |
| Binary order | $2^7$ | $2^6$ | $2^5$ | $2^4$ | $2^3$ | $2^2$ | $2^1$ | $2^0$ |
| Content (53) | 0 | 0 | 1 | 1 | 0 | 1 | 0 | 1 |

The flow now occurring is from PC#1 to PC#2 to PC#4 and back to PC#1 as follows. Starting in PC#1, presuming that it is not now desired to change the bearing or other indication represented by the number "53," core B1*s* is false. Thus the E and F register contents are recirculated and PC#2 is entered. Here the registers are compared and the number in the F register is found to be not larger than that in the E register. Core A1*s* remains false as a result of the comparison and PC#4 is entered. The equality test in PC#4 is successful, core A1*s* continues in the false state and PC#1 is re-entered. Indicating device 17 is not pulsed and the indication thereof, "53," is not changed.

It is now desired that the indication be changed to 143. This number is entered into the computer memory 11 (FIG. 1) and core B1*s* is set true. At the next excursion of the flow through PC#1, the true state of core B1*s* will effectuate the replacement of the number "53" in the E register with the new bearing "143," expressed binarily as 10001111. In PC#2, the comparison will show that $(E) \geqq (F)$, core A1*s* will remain false and the routine will advance to PC#4. Here the test for equality will fail and core A1*s* will be set true. In PC#5, a unit will be added to the F register content, which will become "54," expressed binarily as 00110110. Indicator drive core 61 (FIG. 12) will be set true and then false, and a pulse on conductor 64 will activate indicating device 17 to increase its indication by one unit. PC#1 will be re-entered. The sequence from PC#1 to PC#2 to PC#4 to PC#5 and back to PC#1 again normally would be conducted 90 times until the F register attains the E register content, "143."

However, it will be further presumed that, when the F register attains a content of "97," expressed binarily as 01100001, a second new bearing is entered into memory 11. This second bearing is "24," expressed binarily as 00011000. This number is entered into the E register during PC#1 and it is noted that it is less than the number "97" presently in the F register. During PC#2, then, the comparison indicates that $(F) > (E)$, core 1A*s* is set true and PC#3 is entered. Here a unit is subtracted from the F register content, which will become "96," expressed binarily as 01100000. Indicator drive core 60 (FIG. 12) will be set true and then false and a pulse on conductor 63 will activate indicating device 17 to decrease its indication by one unit. PC#1 will be reentered. The sequence from PC#1 to PC#2 to PC#3 and back to PC#1 is repeated 73 times until the F register attains the E register content "24." Thus the reading for the pointer 14 of the indicating device 17 agrees with the desired bearing and the circuitry merely recirculates without providing any further control pulses until a new bearing is read into the E register from the memory.

While the form of the invention shown and described herein is admirably adapted to fulfill the objects primarily stated, it is to be understood that it is not intended to confine the invention to the one form or embodiment disclosed herein, for it is susceptible of embodiment in various other forms, and the invention is therefore to be limited only as indicated by the scope of the appended claims.

What is claimed is:

1. A digital computer for performing logical operations on stored data on successive word periods, the combination comprising: first means including means for providing signal demarking computer operating intervals; a data processing unit for performing the operations, said data processing unit including a plurality of inhibit-wound magnetic core registers; a programming unit for controlling the operations to be performed by said data processing unit, said programming unit also including a plurality of inhibit-wound magnetic core registers, each said register for both said units comprising a respective array of storage cores for storing data, a respective array of control cores for performing logical arithmetical operations on stored data, and a respective common sense conductor for both said arrays, and transfer circuit means connected to and responsive to signals generated on said sense conductor, for supplying inhibiting signals to the cores of the registers, said transfer circuit means being constructed and arranged to receive respective signals generated on their sense conductors during one operating interval and in response thereto produce corresponding contemporaneous inhibit signals during the next succeeding operating interval, and including means to apply at least two of the produced inhibit signals to respective inhibit windings of at least one of the register cores; means connected to said first means, including a source of timing signals for defining a computer word period and a source of storage and control clock signals, the signals from said sources providing composite four phase read-write driving signals for both the storage and control cores of said registers, each said transfer circuit means being operable to supply its respective inhibiting signals coincident with the write driving signals for one of the arrays in accordance with data signals read out of the other of the arrays, and said transfer circuit means for said programming unit also operable to supply inhibiting signals coincident with the write driving signal to render certain of the control cores of said data processing unit registers operable.

2. A cyclically operable digital computer operable through time intervals each termed a computer word period, said computer comprising a data processing unit and a programming unit, each of which comprises a plurality of registers each of which registers includes first and second magnetic core arrays; a source of read signals and write signals for the several first arrays, and a source of read signals and write signals for the several second arrays; for each of said registers, a respective common sense conductor for the pair of arrays thereof; and for each of said registers a respective means comprising a transfer circuit responsive to signals on its respective sense conductor for supplying inhibiting signals to the cores of at least one of the registers; said first and second magnetic core arrays in a register comprising respectively a set of storage cores and a set of control cores, the control cores of a register of said data processing unit being operative to perform a logical arithmetic operation on a datum from an associated storage core in accordance with inhibiting signals obtained from storage cores of said data processing unit in response to registers by a read signal within a computer word period; and the transfer circuits of said programming unit registers providing inhibiting signals to the control cores of said data processing unit to render certain of said control cores effective during each word period.

3. A cyclically operable digital computer operable through time intervals each termed a computer word period, said computer comprising a data processing unit and a programming unit, each of which comprises a plurality of registers each including respective storage and control magnetic core arrays; means including respective sources of recurring read signals and write signals for the storage and the control arrays; for each register a respective common sense conductor for the arrays and a transfer circuit responsive to signals provided on the sense conductor as a result of switching cores by a read signal, said transfer circuit supplying inhibiting signals to cores of at least two of the registers during the application thereto of a write signal; each of the control cores of a register of said data processing unit being operative to perform logical arithmetic operations on datum of an associated storage core in accordance with data read out of the storage cores of the registers into transfer circuits during a word period, the transfer circuits of said programming unit being constructed and arranged to supply during a word period a stable configuration of inhibiting signals to cores of registers of said data processing unit for rendering effective selected control cores thereof, and the transfer circuits of said data processing unit being constructed and arranged to supply inhibiting signals to cores of registers of said programming unit at the end of each word period for rendering effective selected control cores of the programming unit to alter the stable configuration of inhibiting signals supplied by the transfer circuits of said programming unit to the registers of said data processing unit during the succeeding word period.

4. A digital computer cyclically operable through successive time intervals termed computer word periods, said computer comprising a data processing unit and a programming unit, each of which units comprises a respective plurality of registers each register including a storage magnetic core array and a control magnetic core array; means including a source of read signals and write signals for the registers of the units, common sense conductors, one for each register, transfer circuits, one per register, connected with and each responsive to signals on a respective sense conductor and each constructed and arranged for supplying inhibiting signals to cores of the registers, each of the control cores of said data processing unit registers being operative to perform logical arithmetic operations with data transferred from storage cores through transfer circuits by read and write signals during a word period, the transfer circuit for any said unit being constructed and arranged to supply inhibiting signals coincident with the write signal applied to a core of one of the arrays in accordance with data signals read out of a core of the other of the arrays thereof, to thereby cause the core to perform logical arithmetic operations with data transferred from storage cores of the registers, the transfer circuits for said programming unit also being constructed and arranged to supply inhibiting signals coincident with a control write signal to render certain of the control cores of said data processing unit registers operable, and the transfer circuits for said data processing unit also being operable to supply inhibiting signals coincident with a write control signal to render certain of the control cores of said programming unit operable at the end of a word period.

5. A digital computer comprising: first means including a data processing unit comprising a plurality of registers each having first and second arrays of bistable magnetic cores; second means, capable of supplying to the first and second arrays of said cores a respective recurring cycle of true and false switching currents; third means, comprising a programming unit for supplying control signals for controlling the sequence of logical operations performed by second array cores upon information stored in first array cores of said processing unit; fourth means connected to said third means and to said first means and including means for using the control signals from the programming unit to permit at least a selected one of the second array cores of the processing unit to be switched by said switching currents to cause a predetermined logical arithmetic operation to be performed by the selected core with data derived by said switching currents switching selected ones of the first array cores; said third means including said programming unit being constructed and connected to be responsive to signals derived from at least the processing unit, when the said predetermined logical operation has been accomplished, to generate an output signal operative to change the control signals supplied by the programming unit.

6. A digital computer comprising, in combination: first means including a data processing unit; second means including a programming unit and means connecting the data-processing unit to the programming unit; said first means including a plurality of registers and means interconnecting the registers, each of said registers comprising at least one bistable magnetic storage core means coercible to either from the other of true and false states representing respective ones of binary values of a logical proposition, and said registers including data-processing means including similar bistable magnetic control core means for selectively performing logical arithmetical operations on binary information read from said storage core means under control of said programming unit, said storage core means and the similar control core means having electrically interconnected windings, said computer comprising driving means capable of producing a recurring four-period cycle of core-coercive effects for successively during respective periods tending to coercively switch at least one storage core means false, the said control core means first true and then false and, finally, said at least one storage core means true, and also comprising inhibitory means constructed and arranged to prevent switching from the false state of a selected control core which is in the false state, in accordance with the immediately previous state of a selected storage core of at least one register, as evidenced at switching of the selected storage core from true state to false state, and operative, also, to prevent switching of a selected storage core to true state from false state, in accordance with the immediately previous state of a selected control core of the same register, as evidenced at switching of the selected control core from true state to false state, said programming unit comprising means to produce control signals; and said means connecting the data-processing unit to the programming unit being constructed and arranged to receive said control signals and in response thereto select particular ones of said storage core means for operation by said driving means, whereby to cause predetermined logical operations to be accomplished on binary data established in at least one selected storage core means of the same register.

7. A digital computer adapted to perform logical arithmetical operations upon binary functions expressed as binary signals, said computer comprising: first means, including time-interval-demarking clock-signal means, constructed and arranged to supply electric-current clock pulses in repetitive cycles; second means, including a plurality of groups of magnetic core devices each of which core devices comprises a bistable magnetic core and windings inductively linked therewith which windings include drive winding means connected to said first means for passage of clock pulses for coercion of the core alternately toward first and second magnetic states by said clock pulses, and which windings include a plurality of inhibit windings each of which when energized is effective to inhibit reversal of state of the core under contemporaneous coercion by said clock pulses, and each such group comprising respective sensing means including a sense line inductively linked to the cores of the group for production of a sense line signal incident to reversal of state of any core of the group; and third means, including signal means connected to and responsive to a signal generated in a said sense line incident to reversal of state of a said core, to supply an inhibit current signal to inhibit windings linked respectively to at least two cores comprised in different groups of cores, and including other signal means constructed and arranged to supply other contemporaneous data-representing inhibit current signals to other inhibit windings of at least said two cores comprised in said registers, whereby absence of any inhibit current signals through inhibit windings linked to a core permits the core to be coerced through a reversal of magnetic state to produce a sense line signal representative of the logical product of binary arithmetic terms represented by the respective complements of the binary inhibit current signals passed through the inhibit windings of the core.

8. A digital computer according to claim 7, in which said other signal means of said third means comprises a second plurality of groups of magnetic core devices each comprising a bistable magnetic core and windings inductively linked therewith and which windings include inhibit windings and drive winding means connected with the said first means for passage of clock pulses for alternate coercion of the core toward first and second magnetic states by said clock pulses, and including means in said third means connected to inhibit windings of cores of said second plurality of groups of devices, whereby the latter cores are controlled as to change of state by signals supplied at least in part from the signal means of said third means.

9. A digital computer according to claim 8, in which each group of magnetic core devices comprises a register of such devices and in which each of said registers comprises at least one control core and at least one storage core and in which said signal means comprises in each register a respective transfer circuit means connected to and responsive to change of state signals induced in a respective sense line of the register, to store a binary bit and provide a binary current signal through the said two cores comprised in different registers.

10. A digital computer for performing logical operations in accordance with logical terms of respective Boolean equations using inductively wound bistable magnetic cores, said computer comprising: first means, including a group of magnetic cores at least one core of which is provided with a sense line and with clock drive winding means and with a plurality of inhibit windings adapted to said core in accordance with one of said Boolean equations whereby when energized by a clock current pulse the clock winding means will reverse the magnetic state of the core and produce an output signal on its sense line unless concurrently therewith at least one inhibit winding is energized; means effective at selected times to supply to inhibit windings of said core respective energizing inhibit currents representing respective complements of said logical terms to be operated with whereby said core is reversed in state by energization of said clock winding means only in the absence of any such inhibit core energizing current to thereby produce an output on said sense line representative of the logical product of the terms whose complement currents are supplied to the inhibit windings; other means including another such group of magnetic cores with inhibit windings thereon and clock windings thereon; means for supplying energizing clock currents to all the clock windings of the cores during selected intermittent intervals of time; and program control means connected to said first means and constructed and arranged for controlling supply of energizing inhibit currents to respective inhibit windings, each such inhibit current being contemporaneous with a clock current and being representative of the complement of one of said terms.

11. A digital computer for performing logical arithmetic operations with wound bistable magnetic cores, said computer comprising: first means including first and second functional groups of bistable magnetic cores each with respective inductive windings, said groups being termed, respectively, program control, and data processing, and each such group being functionally divided into a plurality of registers each of which registers has a storage section comprising at least one storage core and a control section comprising at least one control core, and every control core having a plurality of conductor inhibit windings inductively linked thereto which when energized inhibit change of state of the core; second means, including means to supply to a respective winding of each of the control cores of the several registers a series of control clock signals which signals comprise read signals and write signals, and including means to supply to a winding of each of the storage cores of the several registers a series of storage clock signals which signals comprise read signals and write signals; third means, including transfer circuit means, one for each register and each having a sense line inductively linked to the cores of its respective register and each having at least one output line connected to windings of cores of its respective register and of at least one other register of a different group; whereby digital data entered into storage cores is read into respective transfer circuit means and thence transferred to at least one respective control core and there subjected to logical arithmetic operations represented by a selection from among reversal of state of the core and prevention of reversal of state, and thence transferred back to storage core means via the transfer circuit.

12. A digital computer comprising, in combination: first means comprising data-processing means; second means comprising programming means; third means comprising interconnecting means interconnecting said first means and said second means; fourth means comprising power means connected to supply power to said first, second and third means; each of said first means and second means comprising respective groups of magnetic-device registers each of which registers comprises a set of at least one two-state magnetic storage device and at least one two-state magnetic control device, and each magnetic storage device and each magnetic control device comprising a respective two-state magnetic means coercible to either of first and second different magnetic states from the other state and each comprising respective drive winding means and respective inhibit windings and respective sense winding means all inductively linked thereto, for generation of a sense-line signal in response to change of state of the magnetic means; said third means comprising a plurality of two-state circuit means, each one for and associated with a respective one of said registers and connected to be controlled by signals generated on the respective sense winding means of the magnetic devices of its associated register, and each of said two-state circuit means having two output lines and being constructed and arranged to supply alternatively on either of said lines either of true and false inhibit-current signals selectively according to the generation of a sense-line signal on the associated sense line, and said two output signal lines each being connected in series with a respective set of at least one of said inhibit windings; said power means being constructed and arranged to supply repetitive cycles of driving currents in successive cycles each of which cycles comprises in order a read storage period, a write control period, a read control period and a write storage period, and said power means also being effective to demark successive sets each of a determinable number of said cycles to demark individual control intervals during any of which a particular functional configuration of true-false signals is supplied by the two-state circuit means of said programming unit on the output signal lines of the two-state circuit means thereof and the configuration of true-false signals supplied to respective inhibit windings of magnetic devices of said data-processing means to control those respective devices during that control interval, and said power means being effective to supply drive currents to drive windings of said storage devices in manners and during periods to tend to coerce the said storage devices to said first state during each of said read storage periods and to said second state during each of said write storage periods and also effective to supply drive currents to drive windings of said control devices in manners and during periods to tend to coerce the said control devices to one of said first and second states during each of said write control periods and to the other of said first and second states during each of said read control periods; and said interconnecting means including connections between individual ones of said two-state circuit means output lines and determined inhibit windings of said magnetic devices;

whereby true and false signals supplied at respectively different times by respective two-state circuit means of said programming unit are effective to inhibit change of state of the magnetic devices of said data-processing unit linked to respective ones of said output lines to control logical operations performable by the latter unit, and whereby by logical operations performed incident to change of state of magnetic devices of said data-processing unit, true and false inhibit current signals supplied by two-state circuit means associated with registers of said data-processing unit incident to change of state of magnetic devices of said data-processing unit are effective to inhibit change of state of the magnetic devices of said programming unit linked to respective ones of inhibit windings connected to receive the latter inhibit current signals, to thus change the said functional configuration of true and false inhibit current signals supplied by the two state registers of said programming unit.

References Cited in the file of this patent

UNITED STATES PATENTS

| | | |
|---|---|---|
| 2,733,861 | Rajchman | Feb. 7, 1956 |
| 2,768,367 | Rajchman | Oct. 23, 1956 |
| 2,775,727 | Kernahan | Dec. 25, 1956 |
| 2,776,419 | Rajchman | Jan. 1, 1957 |
| 2,782,398 | West | Feb. 19, 1957 |
| 2,796,566 | Maynard | June 18, 1957 |
| 2,798,994 | Dicke | July 9, 1957 |
| 2,862,198 | Stuart-Williams et al. | Oct. 8, 1957 |
| 2,882,517 | Warren | Apr. 14, 1959 |

OTHER REFERENCES

Nettell: "Digital Methods in Control Systems," Electronic Engineering (British), vol. 28, No. 337. Pages 108–114 relied on.

UNITED STATES PATENT OFFICE
CERTIFICATE OF CORRECTION

Patent No. 3,017,102 January 16, 1962

Ladimer J. Andrews

It is hereby certified that error appears in the above numbered patent requiring correction and that the said Letters Patent should read as corrected below.

Column 4, line 3, for "2" read -- 22 --; column 8, line 13, for "pragramming" read -- programming --; column 10, line 51 and 65, for "$P_1Wc$", each occurrence, read -- $P_1W_c$ --; column 11, line 17, for "Cc" read -- $C_c$ --.

Signed and sealed this 8th day of May 1962.

(SEAL)
Attest:

ERNEST W. SWIDER
Attesting Officer

DAVID L. LADD
Commissioner of Paten